United States Patent
Muske

(10) Patent No.: US 11,314,632 B2
(45) Date of Patent: Apr. 26, 2022

(54) METHOD AND SYSTEM FOR IDENTIFICATION AND ELIMINATION OF FALSE POSITIVES FROM DELTA ALARMS

(71) Applicant: Tata Consultancy Services Limited, Mumbai (IN)

(72) Inventor: Tukaram Bhagwat Muske, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 68 days.

(21) Appl. No.: 17/084,176

(22) Filed: Oct. 29, 2020

(65) Prior Publication Data
US 2021/0365359 A1    Nov. 25, 2021

(30) Foreign Application Priority Data

May 19, 2020   (IN) .............................. 202021021098

(51) Int. Cl.
*G06F 11/36*  (2006.01)
*G06F 11/32*  (2006.01)

(52) U.S. Cl.
CPC ........ *G06F 11/3692* (2013.01); *G06F 11/327* (2013.01); *G06F 11/3676* (2013.01); *G06F 11/3688* (2013.01)

(58) Field of Classification Search
CPC ............... G06F 11/3692; G06F 11/327; G06F 11/3676; G06F 11/3688
See application file for complete search history.

(56) References Cited

U.S. PATENT DOCUMENTS

| 9,208,057 B2 | 12/2015 | Valdiviezo Basauri et al. |
| 2010/0333069 A1* | 12/2010 | Chandra .................. G06F 8/75 717/126 |

(Continued)

FOREIGN PATENT DOCUMENTS

WO    WO2014180107 A1    11/2014

OTHER PUBLICATIONS

Muske et al., "Efficient Elimination of False Positives using Static Analysis", 2015 (Year: 2015).*

(Continued)

*Primary Examiner* — Chat C Do
*Assistant Examiner* — Noor Alkhateeb
(74) *Attorney, Agent, or Firm* — Finnegan, Henderson, Farabow, Garrett & Dunner LLP

(57) ABSTRACT

This disclosure relates generally to field of elimination of false positives during static analysis of an application code, and, more particularly, to a method and a system for identification and elimination of false positives from delta alarms. Existing static analysis tools report/generate numerous static alarms for a version and the same static alarm also gets reported for the subsequent versions, which are referred to as repeated alarms, while static alarms remaining after the suppression of the repeated alarms, are called delta alarms. In an embodiment, the disclosed method and system for identification and elimination of false positives from delta alarms, wherein the delta alarms are post-processed to identify of a set of false positives using a version aware static analysis technique based on a set of reuse computation techniques implementing conservative or an aggressive approach based on a dynamic configuration input.

15 Claims, 8 Drawing Sheets

(56) References Cited

U.S. PATENT DOCUMENTS

2016/0179508 A1    6/2016  Bates et al.
2017/0075787 A1*   3/2017  Muske ................ G06F 11/3608
2021/0034343 A1*   2/2021  Sistany ............... G06F 9/44589

OTHER PUBLICATIONS

Muske et al., "Repositioning of Static Analysis Alarms", 2018 (Year: 2018).*

Hanam, Quinn et al., "Aiding Code Change Understanding with Semantic Change Impact Analysis", International Conference on Software Maintenance and Evolution (ICSME), 2019, IEEE, http://www.ece.ubc.ca/~qhanam/icsme2019/icsme_2019_camera_ready.pdf.

Palomba, Fabio et al., "Detecting bad smells in source code using change history information", IEEE/ACM International Conference on Automated Software, 2013, pp. 268-278, IEEE, https://www.researchgate.net/publication/261276655_Detecting_bad_smells_in_source_code_using _change_history_information/link/56e2852708aebc9edb1afd3d/download.

* cited by examiner

METHOD AND SYSTEM FOR IDENTIFICATION AND ELIMINATION OF FALSE POSITIVES FROM DELTA ALARMS

CROSS-REFERENCE TO RELATED APPLICATIONS AND PRIORITY

The present application claims priority from Indian non-provisional application no. 202021021098, filed on May 19, 2020.

TECHNICAL FIELD

The disclosure herein generally relates to the field of identification and elimination of false positives during static analysis of an application code, and, more particularly, to a method and a system for identification and elimination of false positives from delta alarms generated during static analysis of an application code.

BACKGROUND

Testing is a process of validating and verifying whether a software program or application or product meets the expected business and technical requirements. A widely used technique in practice for ensuring software program quality and reliability is static analysis, wherein a software program or application code or a code is analyzed to detect defects without executing the program or application code.

During static analysis, an application code is analyzed using static analysis tools to generate one or more static analysis warnings/alarms, wherein each of the alarms generated is a warning message to a user notifying a potential defect at that program point. The generated alarms are reported to a user by the static analysis tools to decide the safety at the program points in the application code corresponding to the alarms. Further in practice, many alarms are falsely generated. Such falsely generated alarms that do not represent any defects are referred to as false positives. Typically, the decision about the safety of alarms (that includes false positives) reported is made by the user manually, by inspecting the alarms and the code associated with the alarms. However, the manual reporting is very expensive, tedious, and error-prone.

Among existing source code analysis techniques, version aware static analysis techniques and model checking techniques are very popular. Version-aware static analysis techniques are well-known source code analysis technique to generate static analysis warnings/alarms by incrementally analyzing the source code of the program. The model checking-based automated false positives elimination techniques postprocess alarms using a model checking tool, commonly called a model checker, wherein in general a large number of calls are made to the model checker to verify whether each of the alarms is a false positive. The calls made to a model checker, called model checking calls, are known to take considerable amount of time and ultimately renders the mode checking-based an automated false positive elimination (AFPE) to be unsuitable for postprocessing alarms generated on large systems. The version-aware static analysis techniques perform version-aware/incremental static analysis that analyze a current version of the code in comparison with one of the previous versions of the code wherein a subset of alarms that repeat across two subsequent versions are suppressed. The alarms reported by these techniques, after the suppression of repeated alarms, are called "delta alarms", as they represent a change in alarms. However, even after the suppression of repeated alarms, the existing version-aware static analysis techniques still report many alarms, thus making the identification of false positives challenging.

SUMMARY

Embodiments of the present disclosure present technological improvements as solutions to one or more of the above-mentioned technical problems recognized by the inventors in conventional systems. For example, in one embodiment, a method for identification and elimination of false positives from delta alarms is provided.

For example, in one embodiment, a method for identification and elimination of false positives from delta alarms is provided. The method includes receiving, by one or more hardware processors, an input data from a plurality of sources, wherein the input data comprises a source code from a plurality of source codes, a previous version of the source code, a static analysis results of the previous version of the source code and an automated false positives elimination (AFPE) results of the previous version of the source code. The method further includes generating, by one or more hardware processors, a set of alarms on the source code, based on analysis of the source code using at least one static analysis tool, via the one or more hardware processors. The method further includes constructing, by the one or more hardware processors, a code map using the source code and the previous version of the source code, based on a code mapping technique, via the one or more hardware processors. The method further includes constructing, by the one or more hardware processors, a set of delta alarms from amongst the set of alarms, using a delta alarms identification technique based on the code map and the static analysis results of the previous version of the source code, wherein the set of delta alarms comprises a plurality of newly generated alarms and a plurality of impacted alarms. The method further includes identifying, by the one or more hardware processors, a plurality of false positives from the set of delta alarms, wherein identifying the plurality of false positives comprises: generating an assertion for each the delta alarms from amongst the set of delta alarms; generating at least one annotated code based on an annotation technique, wherein each of the annotated code comprises at least one assertion; pre-processing each of the annotated code based on a set of pre-processing techniques to obtain at least one preprocessed annotated code, wherein the set of pre-processing techniques is selected based on a dynamic configuration input; identifying iteratively at least one verification call for the assertions in each of the preprocessed annotated code, wherein the verification call is based on a verification context provided as an input function from the pre-processed annotated code; computing a set of reusable verification calls and a set of non-reusable verification calls from the identified verification calls based on a reuse computation technique using the delta alarms associated to the assertions in the annotated code, the verification context, and the AFPE results from the previous version source code, wherein the reuse computation technique includes a conservative reuse technique or an aggressive reuse technique; making the verification calls to a verification tool for the set of non-reusable verification calls to obtain a set of verification results of non-reusable verification calls; obtaining a set of verification results of reusable verification calls based on the AFPE results on the previous version of the source code and identifying a plurality of false positives in the delta alarm corresponding to the assertions in the annotated code based on the set of verification results of the non-reusable verification calls and the set of verification results of the reusable verification calls. The method further includes eliminating, by one or more hardware processors, the false positives from the set of delta alarms to obtain a set of delta alarms remaining after the elimination and displaying the remaining delta alarms on a report display screen, wherein the displaying includes reporting the delta alarms remaining after the elimination of the false positives.

In another embodiment, a system for identification and elimination of false positives from delta alarms is provided. The system includes one or more hardware processors, a communication interface, and a memory storing a plurality of instructions. The plurality of instructions when executed cause the one or more hardware processors to receive a plurality of input data, wherein the input data comprises a source code from a plurality of source codes, a previous version of the source code, a static analysis results of the previous version of the source code and an automated false positives elimination (AFPE) results of the previous version of the source code. Further the system generates, by one or more hardware processors, a set of alarms on the source code, based on analysis of the source code using at least one static analysis tool, via the one or more hardware processors. Further the system constructs, by the one or more hardware processors, a code map using the source code and the previous version of the source code, based on a code mapping technique, via the one or more hardware processors. Further the system constructs, by the one or more hardware processors, a set of delta alarms from amongst the set of alarms, using a delta alarms identification technique based on the code map and the static analysis results of the previous version of the source code, wherein the set of delta alarms comprises a plurality of newly generated alarms and a plurality of impacted alarms. Further the system identifies, by the one or more hardware processors, a plurality of false positives from the set of delta alarms, wherein identifying the plurality of false positives comprises generating an assertion for each the delta alarms from amongst the set of delta alarm, generating at least one annotated code based on an annotation technique, wherein each of the annotated code comprises at least one assertion, pre-processing each of the annotated code based on a set of pre-processing techniques to obtain at least one preprocessed annotated code, wherein the set of pre-processing techniques is selected based on a dynamic configuration input, identifying iteratively at least one verification call for the assertions in each of the pre-processed annotated code, wherein the verification call is based on a verification context provided as an input function from the pre-processed annotated code, computing a set of reusable verification calls and a set of non-reusable verification calls from the identified verification calls based on a reuse computation technique using the delta alarms associated to the assertions in the annotated code, the verification context, and the AFPE results from the previous version source code, wherein the reuse computation technique includes a conservative reuse technique or an aggressive reuse technique, making calls to a verification tool for each of the verification call in the set of non-reusable verification calls to obtain a set of verification results of non-reusable verification calls, obtaining a set of verification results of reusable verification calls based on the AFPE results on the previous version of the source code, and identifying a plurality of false positives in the delta alarms corresponding to the assertions in the annotated code based on the set of verification results of the non-reusable verification calls and the set of verification results of the reusable verification calls. Further the system eliminates, by one or more hardware processors, the false positives from the set of delta alarms to obtain a set of delta alarms remaining after the elimination and displaying the remaining delta alarms on a display screen, wherein the displaying includes reporting the delta alarms remaining after the elimination of the false positives.

In yet another embodiment, a non-transitory computer readable medium for identification and elimination of false positives from delta alarms is provided. The non-transitory computer readable medium is comprised of the plurality of instructions stored in the memory, and when executed, performs the following steps using the one or more hardware processors to perform the identification and elimination of false positives from delta alarms. In this method, during the identification and elimination of false positives from delta alarms, an input data from a plurality of sources, wherein the input data comprises a source code from a plurality of source codes, a previous version of the source code, a static analysis results of the previous version of the source code and an automated false positives elimination (AFPE) results of the previous version of the source code is received. The method further includes generating, by one or more hardware processors, a set of alarms on the source code, based on analysis of the source code using at least one static analysis tool, via the one or more hardware processors. The method further includes constructing, by the one or more hardware processors, a code map using the source code and the previous version of the source code, based on a code mapping technique, via the one or more hardware processors. The method further includes constructing, by the one or more hardware processors. a set of delta alarms from amongst the set of alarms, using a delta alarms identification technique based on the code map and the static analysis results of the previous version of the source code, wherein the set of delta alarms comprises a plurality of newly generated alarms and a plurality of impacted alarms. The method further includes identifying, by the one or more hardware processors, a plurality of false positives from the set of delta alarms, wherein identifying the plurality of false positives comprises: generating an assertion for each the delta alarms from amongst the set of delta alarms; generating at least one annotated code based on an annotation technique, wherein each of the annotated code comprises at least one assertion; pre-processing each of the annotated code based on a set of pre-processing techniques to obtain at least one preprocessed annotated code, wherein the set of pre-processing techniques is selected based on a dynamic configuration input; identifying iteratively at least one verification call for the assertions in each of the preprocessed annotated code, wherein the verification call is based on a verification context provided as an input function from the pre-processed annotated code; computing a set of reusable verification calls and a set of non-reusable verification calls from the identified verification calls based on a reuse computation technique using the delta alarms associated to the assertions in the annotated code, the verification context, and the AFPE results from the previous version source code, wherein the reuse computation technique includes a conservative reuse technique or an aggressive reuse technique; making the verification calls to a verification tool for the set of non-reusable verification calls to obtain a set of verification results of non-reusable verification calls; obtaining a set of verification results of reusable verification calls based on the AFPE results on the previous version of the source code and identifying a plurality of false positives in the delta alarm corresponding to the assertions in the annotated code based on the set of verification results of the non-reusable verification calls and the set of verification results of the reusable verification calls. The method further includes eliminating, by one or more hardware processors, the false positives from the set of delta alarms to obtain a set of delta alarms remaining after the elimination and displaying the remaining delta alarms on a report display screen, wherein the displaying includes reporting the delta alarms remaining after the elimination of the false positives.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
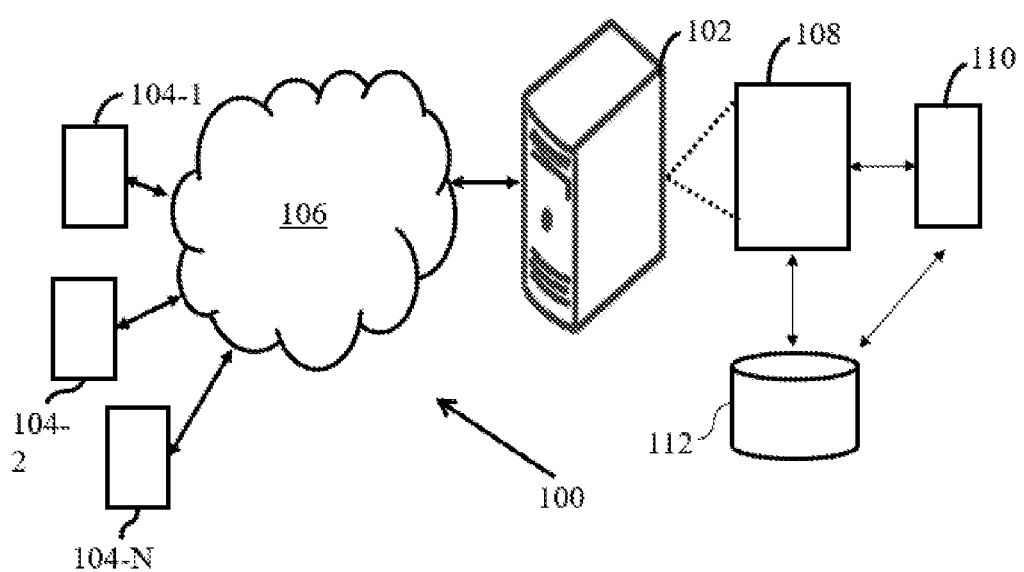
FIG. 1 illustrates a block diagram of a system for identification and elimination of false positives from delta alarms, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Glossary—Terms Used in the Embodiments

The expression "application code" or "application" or "program" or "program code" or "code" or "version code" in the context of the present disclosure refers to a software code that is given as an input.

The expression "static analysis alarm" or "alarm" or "static analysis warnings" or "static alarms" or "program" in the context of the present disclosure refer to one or more static analysis warnings/alarms generated when an application code is analyzed using static analysis tools.

The expression $V_1$ and $V_2$ are two different versions of the same source code, wherein $V_1$ is sequentially older/previous version, and $V_2$ is newer version in comparison with $V_1$. For explanation purpose, the term "source code" refers to $V_2$, and the term "the previous version of the source" refers to $V_1$. However when a reference is made to "sample", that is a reference to example/sample code shared for explanation purpose.

Terms and Notations:

a) Control Flow Graph (CFG)

CFG of a program is a directed graph $\langle \rangle$, $\varepsilon \aleph$, where $\aleph$ is a set of nodes representing program statements (e.g., assignments and conditional statements), and $\varepsilon$ is a set of edges such that an edge $\langle n, n' \rangle$ represents a possible flow of program control from $n \in \aleph$ to $n' \in \aleph$ without any intervening node. $n \rightarrow n'$ denotes an edge from node n to node n'. Depending on whether the program control flows conditionally or unconditionally along an edge, the edge is labeled either as conditional or unconditional. A CFG has two distinguished nodes Start and End, representing the entry and exit of the corresponding program, respectively. Except for the Start and End nodes, it is assumed that there is a one-to-one correspondence between the CFG nodes and their corresponding program statements. Thus, the terms 'statement' and 'node' are used interchangeably. Henceforth, in code examples $n_m$ denotes the node of a program statement at line m. Also, note that terms "code" and "source code" are used interchangeably. Hence "code analysis" and "source code analysis" refer to the same process.

b) Data Dependencies

Let $d_x$: x=y be a definition of x at program point $d_x$. $d_x$ is reaching definition of x at a program point p if there exists a path from entry point of the program to p such that $d_x$ is on this path and x is not redefined between $d_x$ and p. A variable v at a program point p is considered as data dependent on definition d of v, if d if reaching definition of v at p. Data dependencies of a variable are definitions on which the variable is data dependent. For a reaching definition d of v, assignExpr(d) is used to denote an assignment expression at d: the expression at d having an assignment to v. The data dependencies of an assignment expression e are said to be same as union of data dependencies of variables in right hand side (RHS) of e. For other type of expression e' (non-assignment expression), data dependencies of e' are same as union of data dependencies of variables in e'.

c) Control Dependencies

A node u post-dominates a node v if every path passing through v also passes through u. A node w is said to be control dependent on a conditional edge $u \rightarrow v$ if w post-dominates v; and if $w \neq u$ w does not post-dominate u. Control dependencies of a node n are the conditional edges on which n is control dependent. A conditional edge e is called as a transitive control dependency of a point p if e belongs to the transitive closure of control dependencies of p. For a given control dependency $u \rightarrow v$, label($u \rightarrow v$) is used to denote it's label, and condExpr($u \rightarrow v$) and is used to denote the conditional expression associated with the branching node u. When a conditional edge $u \rightarrow v$ is from a switch statement to one of its case statements, we assume that the label of that edge is same as the case label. Control dependencies of an expression e are same as the control dependencies of the node corresponding to e. For a data dependency $d_x$: x=expr, data dependencies of $d_x$ are same as the data dependencies of expr. For a control dependency e, data dependencies of e are same as the data dependencies of condExpr(e). Control dependencies of a data dependency $d_x$:

x=expr (resp. a control dependency u→v) are same as the control dependencies of node corresponding to $d_x$ (resp. node u).

Let $\alpha$ be a variable/expression at a program point p, or a data/control dependency. The notation $$d_\alpha \xrightarrow{d} \alpha \ \left(resp. \ e_\alpha \xrightarrow{c} \alpha\right)$$

is used to denote $d_\alpha$ is a data dependency of $\alpha$ (resp. $e_\alpha$ is a control dependency of $\alpha$). A data dependency d is a transitive data dependency of $\alpha$ if $$d_1 \xrightarrow{d} d_2 \xrightarrow{d} d_3 \xrightarrow{d} \ldots \xrightarrow{d} d_k,$$

where $$d_1 = d, \ d_k = \alpha, \ d_i \xrightarrow{d} d_{i+1},$$

and k>=2. The notation $$d \xrightarrow{d+} \alpha$$

is used to denote that d is a transitive data dependency of $\alpha$. Let D be the set of all possible data dependencies (definitions of variables) in the program. We call dDepTransClosure($\alpha$) is transitive closure of data dependencies of $\alpha$ if and only if $$dDepTransClosure(\alpha) = \left\{d \mid d \epsilon D, \ d \xrightarrow{d+} \alpha\right\}.$$

On similar lines, a control dependency e is a transitive control dependency of $\alpha$ if $$e_1 \xrightarrow{c} e_2 \xrightarrow{c} d_3 \xrightarrow{c} \ldots \xrightarrow{c} e_k,$$

where $$e_1 = e, \ e_k = \alpha, \ e_i \xrightarrow{c} e_{i+1},$$

and k>=2. The notation $$cdDep \xrightarrow{cd+} \alpha$$

is used to denote that cdDep is a data or control dependency of $\alpha$. A dependency cdDep is a transitive data and control dependency of $\alpha$ $$\left(\text{shown as } cdDep \xrightarrow{cd+} \alpha\right)$$

if $$cd_1 \xrightarrow{cd} cd_2 \xrightarrow{cd} cd_3 \xrightarrow{cd} \ldots \xrightarrow{cd} cd_k,$$

where $$cd_1 = cdDep, \ cd_k = \alpha, \ cd_i \xrightarrow{cd} cd_{i+1},$$

and k>=2. Let C be the set of all possible control dependencies (conditional edges) in the program. We call cdDepTransClosure($\alpha$) is transitive closure of data and control dependencies of $\alpha$ if and only if $$cdDepTransClosure(\alpha) = \left\{d \mid d \epsilon D, \ d \xrightarrow{cd+} \alpha\right\} \cup \left\{e \mid e \epsilon C, \ e \xrightarrow{cd+} \alpha\right\}$$

d) Program Slicing

For a given program and a set of variables at a program point of interest, program slicing techniques compute a reduced program that contains only those statements that are likely to influence the values of the variables at that program point. The reduced program is called a program slice. Depending on the use of program slice, several slicing techniques are used, such as backward slice, and thin slice. Backward program slice (also called backward slice) consists of the program statements which correspond to a transitive closure of data and control dependencies, that is, a backward slice consists of both assignment and conditional statements that can influence values of variables(s) at the program point of interest Static Analysis Alarms A static analysis tool checks the program code to determine where in the program code errors like division by zero (DZ) and array index out of bound (AIOB) are likely to occur. $D_n$ and $A_n$ respectively are used to denote an alarm generated at line n for these two verification properties. An expression that is checked by a static analysis tool is termed as a point of interest (POI). For example, a POI for check related to DZ and AIOB respectively corresponds to denominator and access of an array with its index. poi($\phi$) is used to denote the POI of an alarm $\phi$, and $\phi_{l,V}^p$ denotes an alarm reported for a POI of verification property p, present at line l in version V. A slice generated for an alarm $\phi$ is considered to be same as the slice generated for poi($\phi$) cond($\phi$) is used to denote alarm condition of an alarm $\phi$, i.e., the check performed by the analysis tool for detecting an error. The alarm condition of an alarm is such that evaluation of the alarm condition to true indicates that the alarm is a false positive, and its evaluation to false indicates the alarm is an error. The alarm condition of an alarm is a logical formula, for example 0≤x≤11, which is independent of the program point of the alarm. The alarms $\phi$ and $\phi'$ of the same property are considered to be similar if cond($\phi$)⇔cond($\phi'$).

e) Delta Alarms or Delta Static Alarms:

When applying a static analysis tool (also to be referred to as "tool") to evolving systems, numerous alarms reported by the static analysis tool for one version may also get reported for the subsequent one, which are referred to as a set of repeated alarms. A few alarms postprocessing techniques aim to reduce the number of repeated alarms by taking into account the code changes between the two versions and the code changes are called version-aware static analysis techniques (VSATs). Among the existing postprocessing techniques, VSATs are most popular, and are different from the history-aware alarms ranking techniques which analyze the software change history over multiple previous versions of the code to rank alarms generated on the current version, whereas the VSATs aim to identify alarms that repeat across the previous version and the current version and suppress the alarms by taking into account the code changes between the two versions. The alarms reported by VSATs, that is the alarms remaining after the suppression of repeated alarms, are called "delta alarms", wherein a delta alarm reported by a VSAT is either newly generated alarm or a repeated alarm that is impacted by a code change between the two versions (called an impacted alarm because the alarm may be a new error due to a code change between the two versions). The popular reliable VSATs use different techniques to compute the impacted alarms. In an example, impact-analysis based VSAT performs impact analysis of the code changes to determine the POIs of the alarms are affected due to the code changes, however, the other reliable VSAT extracts necessary/sufficient conditions from the previous version $V_1$ and inserts them into the corresponding locations in the code of version $V_2$. Further, analyzing the conditions-inserted code of $V_2$ suppresses the repeated alarms that are safe to be suppress.

f) Existing Techniques for Automated Elimination of False Positives Based on Verification Technique Model Checking:

Among the code verification techniques model checking is commonly used during the automated identification and elimination of false positives from the alarms. The calls made to these verification tools during the automated false positives elimination (AFPE) are called verification calls. The AFPE techniques generate an assertion corresponding to each alarm and use a code verification tool like a model checker to verify the assertions. The results for a verification call verifying an assertion include the assertion is verified successfully (that is, the assertion holds), a counterexample is generated for the assertion, the call times out after given time threshold, the call runs out of memory, or there is an error during the verification. The existing AFPE techniques can be based on model checking or code verification of techniques, wherein the AFPE techniques have a few limitations that are described in this section. In model checking-based AFPE, an alarm is eliminated as a false positive when its corresponding assertion holds. In order to overcome the known issue of non-scalability of these verification tools on large code, the code verified in the context expansion approach (starting the code verification from the smallest possible context, and gradually increasing the context of the code to be verified on demand basis. Therefore, existing techniques AFPE considerably increases the number of models checking calls (that is the verification calls), and hence, further degrades efficiency of the AFPE. Further grouping of related assertions has been implemented by several prior arts to verify multiple related assertions together, and thus to reduce the number of models checking calls. However, the number of generated groups of related assertions is still large, and the context expansion approach gets applied to each group. Evaluations of the context expansion-based the AFPE techniques indicate that processing an assertion or a group of related assertions, on average, results in making five model checking calls and takes around three to four minutes. Due to the large number of models checking calls and each call taking considerable amount of time, applying the AFPE to alarms becomes time-consuming and ultimately renders the AFPE unsuitable for postprocessing alarms generated on large systems. For example, processing 200 groups of related alarms would require more than 10 hours.

State-of-the-art uses model checking/checker-based efficient elimination of the false positives generated during the static analysis of the application code. A simple and cost-effective solution was provided by the Applicant in Indian Patent Application No. IN3537MU2015 titled 'Static analysis based efficient elimination of false positive', wherein a method for model checking-based efficient elimination of false positives from static analysis warnings generated during static analysis of an application code is provided. This method is based on analysis of the source code of the current version $V_2$ only and predicts output of the verification calls, without considering any of the previous version of the code $V_1$. The output of a verification call is based on flow of values assigned to variables in the assertions generated for the alarms.

Also, in addition to the cited prior art, the existing techniques do not consider or focus on code changes made between the two consecutive versions $V_1$ and $V_2$ to improve efficiency of the AFPE, wherein there is no comparison between multiple versions of the source code to identify a set of verification calls whose results can be reused and used to reduce the time taken to identify any false positives.

The disclosed method and system addresses the issues listed above by efficient elimination of false positives, based on identification of verification calls that also repeat across the two versions, and skipping the verification calls which are identified as repeated and are not impacted by the code changes. The results for such skipped verification calls (non-impacted verification calls) are obtained from the results of the corresponding verification calls made during the AFPE applied on $V_1$, thus making the disclosed method and system different from the existing prior arts including Application no. IN3537MU2015. Although the technical problem was realized by the Applicant after providing the disclosure of Application no. IN3537MU2015, it may be understood by a person skilled in the art, that the present disclosure may be applicable to effective elimination of false positives, in general, and is not limited to use of the effective elimination of false positives as in Application no. IN3537MU2015.

Referring now to the drawings, and more particularly to FIG. 1 through FIG. 5D, where similar reference characters denote corresponding features consistently throughout the figures, there are shown preferred embodiments and these embodiments are described in the context of the following exemplary system and/or method.

FIG. 1 illustrates a block diagram of a system (100) for identification and elimination of false positives from delta alarms, in accordance with an example embodiment. Although the present disclosure is explained considering that the system (100) is implemented on a server, it may be understood that the system (100) may comprises one or more computing devices 102, such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system (100) through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system (100) through communication links.

The system (100) may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system (100).

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
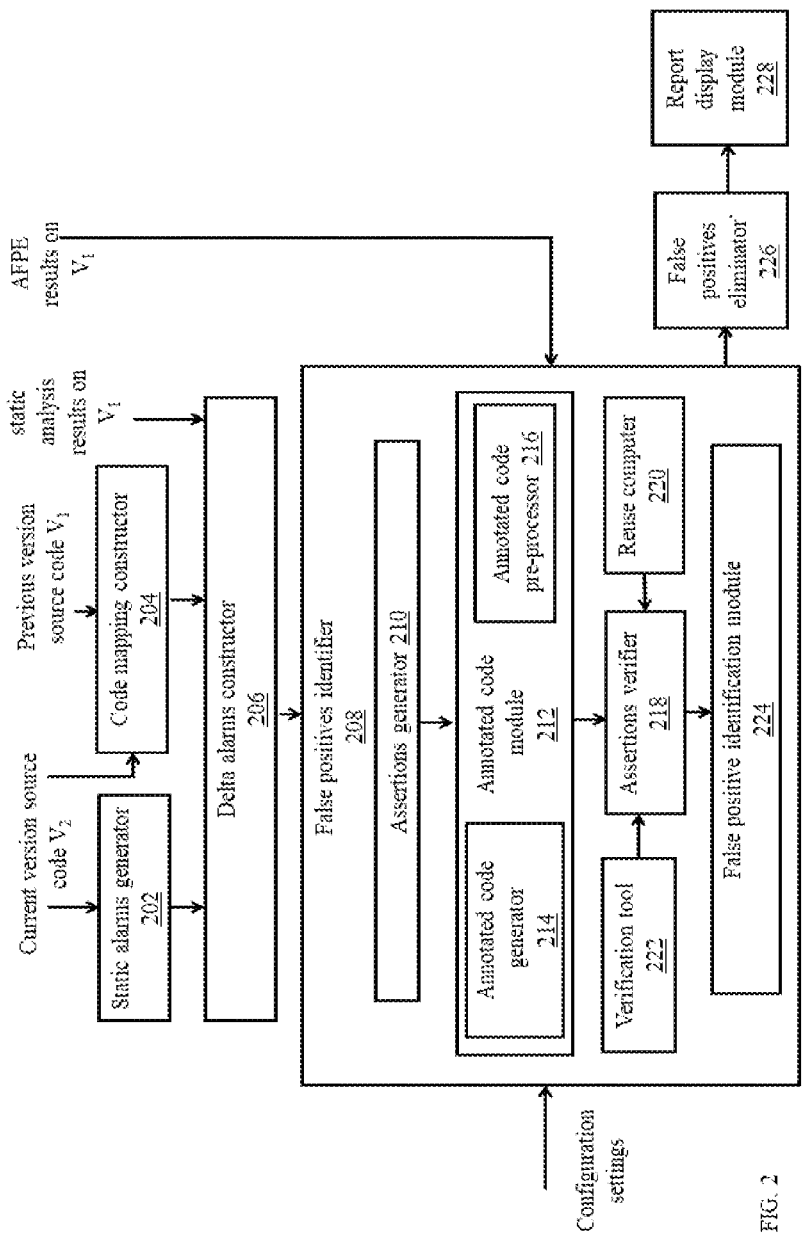
FIG. 2 depicts an example implementation of the system of FIG. 1, and data flow between various system components, according to some embodiments of the present disclosure.

According to an embodiment of the disclosure, the system (100) is configured for identification and elimination of false positives from delta alarms as shown in block diagram of FIG. 1. The FIG. 2 depicts an example implementation of the system of FIG. 1, and data flow between various system components, according to some embodiments of the present disclosure, wherein the FIG. 2 shows a functional flow diagram of the system for identification and elimination of false positives from delta alarms. Hence functions of the components of the system (100) are explained in conjunction with functional modules of the system (100) stored in the memory 110 and further explained in conjunction with flow diagrams in FIGS. 5A, 5.B, 5C and 5D.

FIG. 2, with reference to FIG. 1, is a block diagram of various modules stored in the memory 110 of the system (100) of FIG. 1 in accordance with an embodiment of the present disclosure. In an embodiment of the present disclosure, the system (100), is configured for receiving, by one or more hardware processors, a plurality of input data from a plurality of sources, wherein the plurality of input data comprises a source code ($V_2$) from a plurality of source codes, a previous version of the source code ($V_1$), a static analysis results of the previous version of the source code ($V_1$) and results of the automated false positives elimination (AFPE results) on the previous version of the source code ($V_1$). The system (100) further comprises a static alarms generator (202) configured for generating, by one or more hardware processors, a set of alarms on the source code ($V_2$), based on analysis of the source code ($V_2$) using at least one static analysis tool, via the one or more hardware processors. The system (100) further comprises a code mapping constructor (204) configured for constructing, by one or more hardware processors, a code map using the source code ($V_2$) and the previous version of the source code ($V_1$), based on a code mapping technique, via the one or more hardware processors. The system (100) further comprises a delta alarms constructer (206) configured for constructing, by one or more hardware processors, a set of delta alarms from amongst the set of alarms, using a delta alarms identification technique based on the code map and the static analysis results of the previous version of the source code ($V_1$), wherein the set of delta alarms comprise of a plurality of newly generated alarms and a plurality of impacted alarms. The system (100) further comprises a false positives identifier (208) configured for identifying, by one or more hardware processors, a plurality of false positives from the set of delta alarms. The false positives identifier (208) comprises several modules that implement the step of identification of false positives. The false positives identifier (208) in the system (100) comprises an assertions generator (210) configured for generating an assertion for each of the delta alarms. The false positives identifier (208) in the system (100) further comprises an annotated code module (212) that further comprises of an annotated code generator (214) that is configured for generating at least one annotated code based on an annotation technique, wherein each of the annotated code comprises of at least one assertion; and an annotated code pre-processor (216) that is configured for pre-processing each of the annotated code based on a set of pre-processing techniques. The false positives identifier (208) in the system (100) further comprises an assertions verifier (218) that is configured for identifying iteratively at least one verification call for the assertions in each of the preprocessed annotated code, wherein the verification call is based on a verification context provided as an input function from the pre-processed annotated code from the pre-processed annotated code verification tool (222). The false positives identifier (208) in the system (100) further comprises a reuse computer (220) that is configured for computing a set of reusable verification calls and a set of non-reusable verification calls from the identified verification calls based on a reuse computation technique using the delta alarms associated to the assertions in the annotated code, the verification context, and the AFPE results from the previous version source code wherein the reuse computation technique include a conservative reuse technique or an aggressive reuse technique. Further the assertions verifier (208) is configured for making the verification calls to a verification tool (222) for the set of non-reusable verification calls to obtain a set of verification results of non-reusable verification calls and obtaining a set of verification results of reusable verification calls from the reuse computer (220). The false positives identifier (208) in the system (100) further comprises a false positives identification module (224) that is configured for identifying a plurality of false positives in the delta alarms corresponding to the assertions in the each of the annotated code based on the verification results of the non-reusable verification calls and the verification results of the reusable verification calls. The system (100) further comprises a false positives eliminator (226) that is configured for eliminating, by one or more hardware processors, the false positives from the set of delta alarms. The system (100) further comprises a report display module (228) configured for displaying the delta alarms remaining after the elimination of the false positives.

The system (100) obtains a plurality of input data from a plurality of sources, wherein the plurality of input data comprises a source code ($V_2$), a previous version of the source code ($V_1$), a static analysis results of the previous version of the source code ($V_1$) and an AFPE results of the previous version of the source code ($V_1$).

In one embodiment, the source code includes a plurality of lines and corresponding tokens on each of the lines. As explained above the system receives a source code ($V_2$), a previous version of the source code ($V_1$), wherein the $V_1$ and the $V_2$ are two different versions of the same application, wherein $V_1$ is older/previous version, and $V_2$ is the newer version in comparison with the source code $V_1$. For explanation purpose, in the claims and the description, the term "source code" refers to $V_2$, and the term "previous version of the source code" refers to $V_1$. A Sample code for the source code $V_2$ and the previous version of the source $V_1$ are given below and the same would be used for explaining examples in the further sections:

| Source code - $V_2$ | | | |
|---|---|---|---|
| 1 | int x, y, z, a[50]; | 1 | int x, y, z, a[50]; |
| 2 | int arr [10] = {. . . . .}; | 2 | int arr [10] = {. . . . .}; |
| 3 | | 3 | |
| 4 | void foo (int p) { | 4 | void foo (int p) { |
| 5 | int m=2, t; | 5 | int m=2, t; |
| 6 | | 6 | |
| 7 | y = lib2 ( ); | 7 | y = lib2 ( ); |
| 8 | z = lib3 ( ); | 8 | z = lib4 ( ); |
| 9 | | 9 | |
| 10 | if (nondet ( )) | 10 | if (nondet ( )) |
| 11 | m=4; | 11 | m=z; |
| 12 | bar (m); | 12 | bar (m); |
| 13 | | 13 | z = 10 / p; //$D_{13}$ New alarm |
| 14 | | 14 | |
| 15 | t = x / y;   // $D'_{15}$ | 15 | t = x / (y-2); // $D_{15}$ New alarm |
| 16 | } | 16 | } |
| 17 | | 17 | |
| 18 | Void bar (int i) { | 18 | Void bar (int i) { |
| 19 | int t = 0, t1; | 19 | int t = 0, t1; |
| 20 | | 20 | |
| 21 | x = lib1 ( ); | 21 | x = lib3 ( ); |
| 22 | t1 = arr [x]; // $A'_{22}$ | 22 | t1 = arr [x]; //$A_{22}$ Impacted |
| 23 | | 23 | |
| 24 | if (z > 20); | 24 | if (z > 20); |
| 25 | t = arr [y]; // $A'_{25}$ | 25 | t = arr [y]; // $A_{25}$ Impacted |
| 26 | | 26 | |
| 27 | a[i] = 5; | 27 | a[i] = 5; // $A_{27}$ New alarm |
| 28 | | 28 | |
| 29 | print (25 / t) ; // $D'_{29}$ | 29 | print (25 / t) ; // $D_{29}$ Impacted |
| 30 | } | 30 | } |

Previous Version of the Source Code—$V_1$

According to an embodiment of the disclosure, the system for identification and elimination of false positives from delta alarms (100) further comprises the static alarms generator (202) configured for generating, by one or more hardware processors, a set of alarms on the source code ($V_2$), based on analysis of the source code ($V_2$) using at least one static analysis tool, via the one or more hardware processors. The input data is received from a user.

In one embodiment, the static alarms generator (202) is a static analysis tool known in art and includes Astree, Polyspace Code Prover, FindBugs, and PMD. The static analysis tool is configured to identify static alarms from analysis of an application code.

According to an embodiment of the disclosure, the system for identification and elimination of false positives from delta alarms (100) further comprises the code mapping constructor (204) configured for constructing, by one or more hardware processors, a code map using the source code ($V_2$) and the previous version of the source code ($V_1$), based on a code mapping technique, via the one or more hardware processors.

Figure 3:
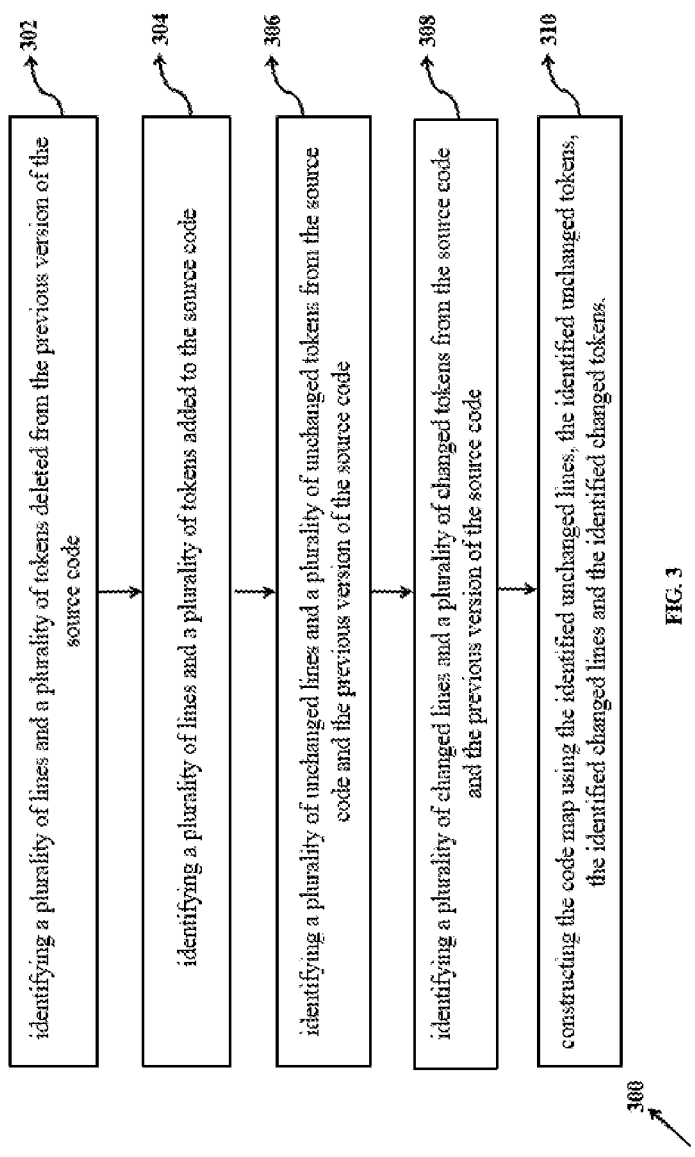
FIG. 3 shows a flow diagram of the system for construction of the code map according to some embodiments of the present disclosure.

In one embodiment, the step of constructing a code map based on the code mapping technique is performed in the code mapping constructor (204). The code mapping constructor (204) receives the source code $V_2$ and the previous version of the source code $V_1$ as inputs, constructs a code map for $V_1$ and $V_2$, using any suitable code mapping technique. In an embodiment, the code mapping constructor (204) generates a code map ($Map_{v_1,v_2}$) based on the source code $V_2$ and the previous version of the source code $V_1$. A line in $V_1$ is denoted as $l_1$ and a line in $V_2$ is denoted as $l_2$. The steps involved in for construction of the code map are depicted using FIG. 3 is listed below:

At step (302), the method (300) includes identifying a plurality of lines and a plurality of tokens deleted from the previous version of the source code.

In the next step at (304), the method (300) includes identifying a plurality of lines and a plurality of tokens added to the source code.

In the next step at (306), the method (300) includes identifying a plurality of unchanged lines and a plurality of unchanged tokens from the source code and the previous version of the source code.

In the next step at (308), the method (300) includes identifying a plurality of changed lines and a plurality of changed tokens from the source code and the previous version of the source code.

In the next step at (310), the method (300) includes constructing the code map using the identified unchanged lines, the identified unchanged tokens, the identified changed lines and the identified changed tokens map.

In an embodiment, the code mapping constructed by the code mapping constructor (204) consists of a map, denoted as $Map_{V1,V2}$: lines($V_1$)→lines ($V_2$)∪{⊥}, which maps source code lines in $V_1$ to their corresponding lines in $V_2$, and to ⊥ if the lines have been deleted from $V_1$. No two lines in $V_1$ map to the same line in $V_2$. This map can be used to compute the following:

(a) A line $l_1$ in $V_1$ is deleted if $Map_{v_1,v_2}(l_1)$=⊥.
(b) A line $l_2$ is added in $V_2$ if there doesn't exist $l_1$ in $V_1$ such that $Map_{v_1,v_2}(l_1)$=$l_2$.
(c) A line $l_1$ in $V_1$ (or $l_2$ in $V_2$) is changed if $Map_{v_1,v_2}(l_1)$=$l_2$ and code on $l_1$ and $l_2$, excluding white spaces, is different.
(d) A line $l_1$ in $V_1$ (or $l_2$ in $V_2$) is unchanged if $Map_{v_1,v_2}(l_1)$=$l_2$ and code on $l_1$ and $l_2$, excluding white spaces, is same.

When $Map_{v_1,v_2}(l_1)$=$l_2$ and $l_2$≠⊥, $l_1$ and $l_2$ are considered as the corresponding lines. For a changed line $l_1$ in $V_1$ and corresponding line $l_2$ in $V_2$, similar to mapping of lines in $V_1$ to $V_2$, the code mapping constructor (204) creates mapping of the tokens in $l_1$ to their corresponding tokens in $l_2$. The tokens on a line are identified as the words on that line or can be tokens that are generated during lexing and parsing of the program source code. The created mapping of tokens $l_1$ to $l_2$ maps every token $l_1$ to its corresponding token in $l_2$, or to ⊥ if the token has been deleted from $l_1$. The token mapping also has one to one correspondence, similar to the line mapping, except in tokens in line part of $V_1$ are deleted and tokens in $l_2$ part of $V_2$ are added. The constructed mapping of the tokens of two corresponding lines $l_1$ in $V_1$ and $l_2$ in $V_2$ is a map and it is denoted as $Map_{l_1,l_2}$:tokens $(l_1)$→tokens $(l_2)$∪{⊥}. The constructed mapping of tokens in the corresponding lines $l_1$ and $l_2$ can be used to determine whether a given token in $l_1$ is deleted, changed, or unchanged. The code mapping module uses one or more code mapping techniques like diff utility, and AST-based program differencing to compute the mapping of the lines i.e. $Map_{V1,V2}$ and the mapping of tokens in the changed lines.

The constructed mapping of the lines i.e. $Map_{V1,V2}$ and the mapping of tokens in the corresponding changed lines is used together, by the delta alarms constructer (206), to compute the following, where an expression is made up of one or more tokens:
 a) An expression $e_1$ on line $l_1$ in $V_1$ is deleted if (1) $l_1$ is deleted from $V_1$, or (2) $l_1$ is changed and every token in $e_1$ is deleted from
 b) An expression $e_2$ is added to line $l_2$ in $V_2$ if (1) $l_2$ is added to $V_2$, or (2) $l_2$ is changed and every token in $e_2$ is added to $l_2$.
 c) An expression $e_1$ on line $l_1$ in $V_1$ (resp. expression $e_2$ on line $l_2$ in $V_2$) is changed if at least one of the tokens in $e_1$ (resp. $e_2$) is changed.
 d) An expression $e_1$ on line $l_1$ in $V_1$ is unchanged if (a) $l_1$ is unchanged, or (b) $l_1$ is changed but none of the tokens in $e_1$ is changed or deleted.
 e) An expression $e_2$ on line $l_2$ in $V_2$ is unchanged if (a) $l_2$ is unchanged, or (b) $l_2$ is changed but none of the tokens in $e_2$ is changed or added.

An expression $e_1$ on line $l_1$ in $V_1$ and an expression $e_2$ on line $l_2$ in $V_2$ are considered as corresponding expressions if (1) $l_1$ and $l_2$ are the corresponding lines, and (2) $e_2$ is a changed version of $e_1$ or is same as $e_1$. A tokens-based approach is used to determine if an expression that spans over multiple lines is added, deleted, or changed, by matching its sub expressions appearing on different lines. To avoid identifying semantically equivalent statements like i=i+1 and i++ as changed, the code mapping module can use code normalization methods to normalize the code. During the code mapping, the code mapping constructor (204) may also perform mapping of changed/unchanged lines and tokens as well.

According to an embodiment of the disclosure, the system for identification and elimination of false positives from delta alarms (100) further comprises the delta alarms constructer (206) configured for constructing, by one or more hardware processors, a set of delta alarms from amongst the set of alarms, using a delta alarms identification technique based on the code map and the static analysis results of the previous version of the source code ($V_1$). The set of delta alarms comprise of a plurality of newly generated alarms and a plurality of impacted alarms along with a corresponding set of impacting code changes for each of the impacted alarms. The delta alarms identification technique is based on known techniques that include a version-aware static analysis techniques (VSATs). Further there are several different techniques for delta alarm generation as performed by the VSAT that includes impact analysis-based VSAT and necessary/sufficient conditions-based VSAT. In an embodiment, considering an example of impact analysis-based VSAT, wherein the impact analysis-based VSAT performs impact analysis of the code changes to determine the point of interest (POIs) of the alarms that are affected due to the code changes. In an another embodiment, considering an example of code based VSAT, wherein the necessary/sufficient conditions-based VSAT extracts a set of necessary/sufficient conditions from the previous version $V_1$ and insert them into the corresponding locations in the code of version $V_2$ and later analysis of the conditions-inserted code of $V_2$ suppresses the repeated alarms that are safe to be suppress.

Figure 4:
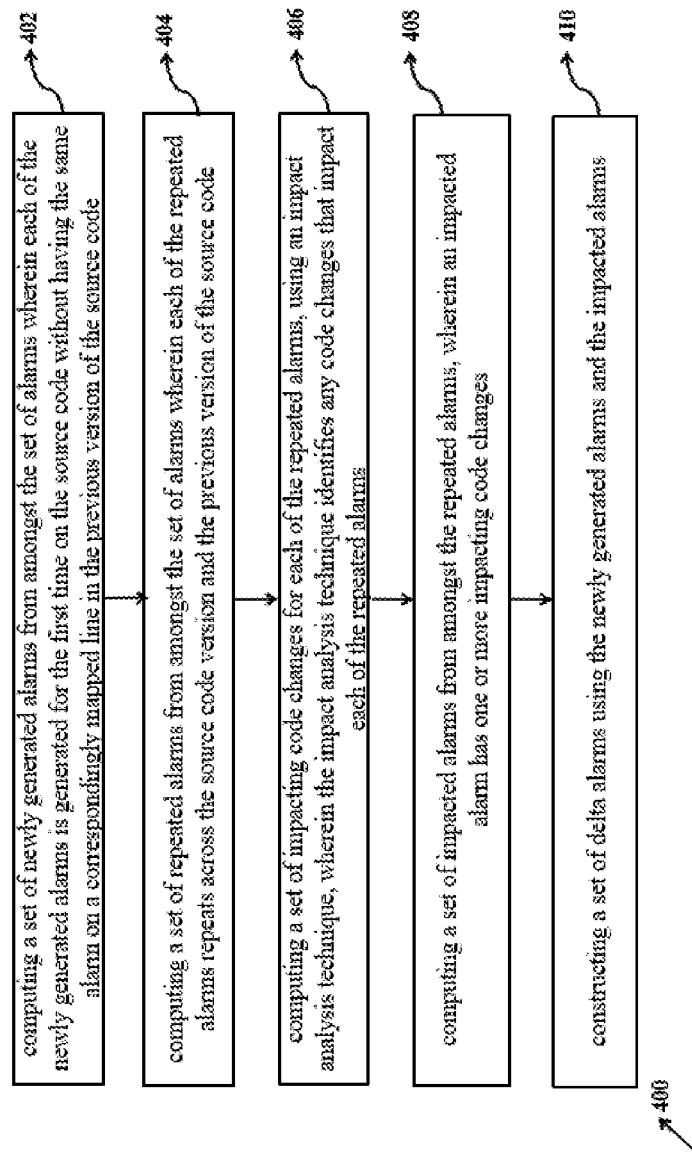
FIG. 4 shows a functional flow diagram of the system for computing a set of delta alarms according to some embodiments of the present disclosure.
Figure 5A:
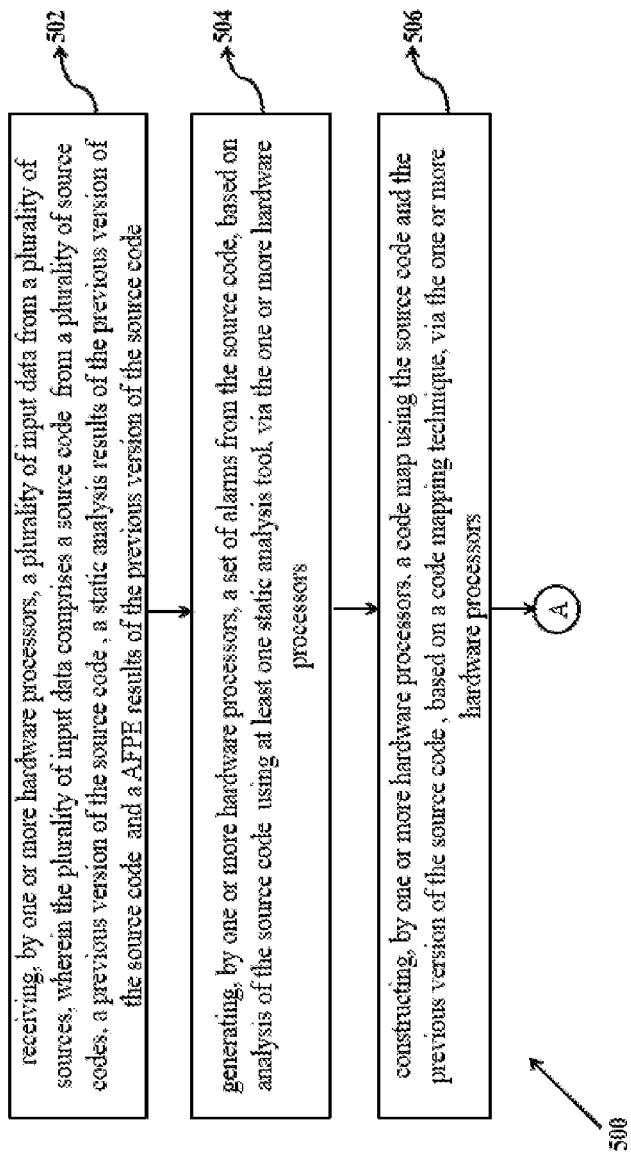
FIG. 5A, FIG. 5B, FIG. 5C and FIG. 5D shows a functional flow diagram of the system for identification and elimination of false positives from delta alarms according to some embodiments of the present disclosure.
Figure 5B:
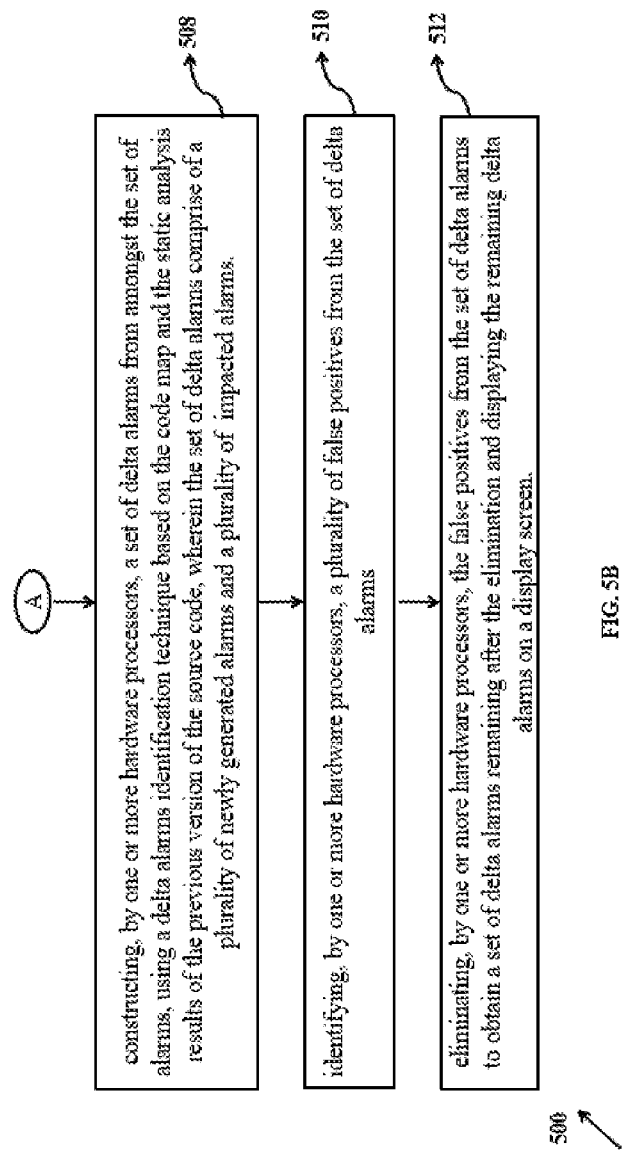
Figure 5C:
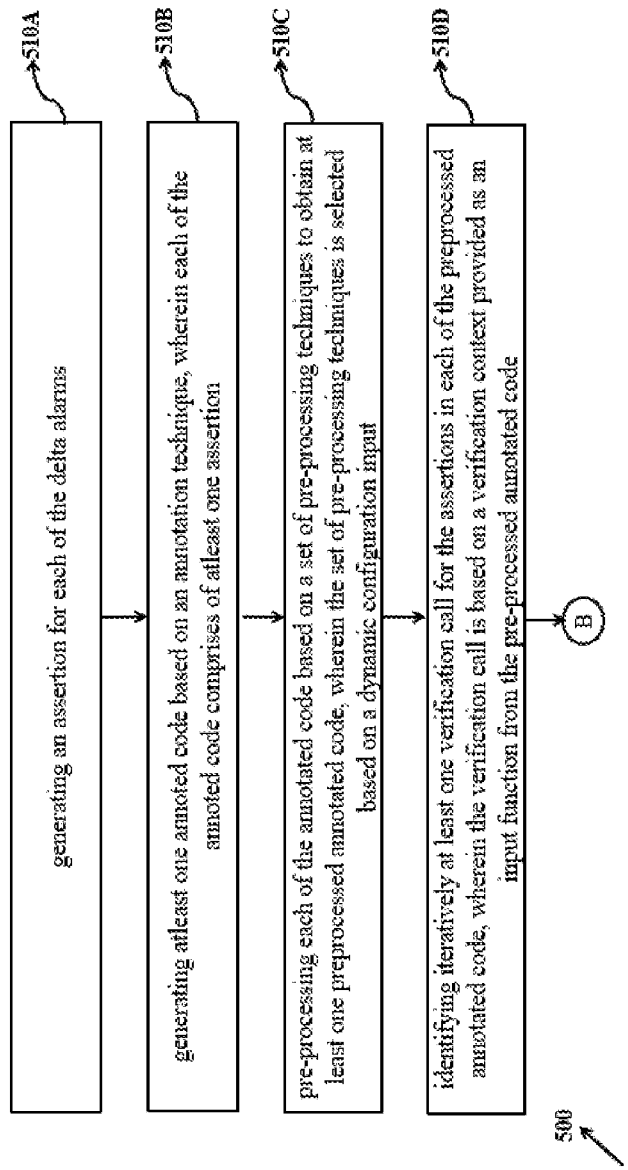
Figure 5D:
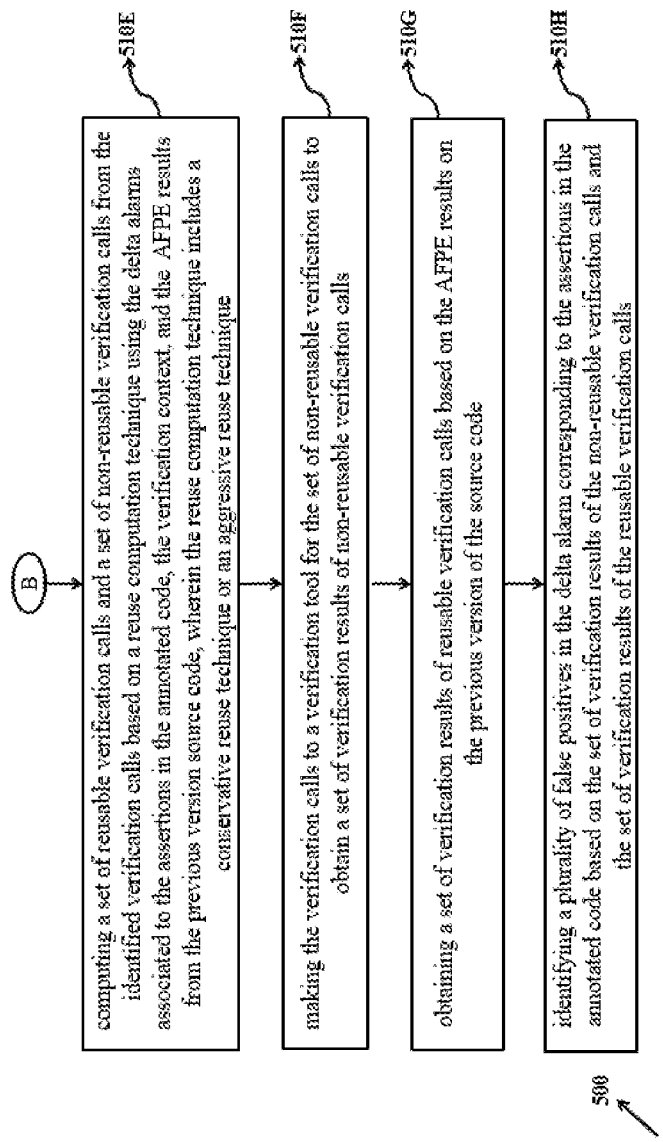

In one embodiment, the step of computing the set of delta alarms comprises of the following steps as explained by method (400) using FIG. 4:

At step (402), the method (400) includes computing a set of newly generated alarms from amongst the set of alarms wherein each of the newly generated alarms is generated for the first time on the source code $V_2$ without having the same alarm on a correspondingly mapped line in the previous version of the source code $V_1$. Hence the newly generated alarms are alarms that have not occurred in the previous version of the source code $V_1$.

In an embodiment, an alarm $\phi$ generated on $V_2$ is classified as a newly generated alarm if the expression of a POI of the delta alarm represented as poi($\phi$), is newly added in $V_2$, and an expression e in $V_1$ is corresponding expression of the POI of the alarm poi($\phi$) and an alarm similar to is not generated for e in $V_1$. The generation or classification of newly generated alarm can be explained using the previous version of the source code ($V_1$) and the source code ($V_2$), wherein the alarm $D_{13}$ in version $V_2$ sample code is a newly generated alarm as a result of addition of a new line at line 13 in $V_2$ in comparison with $V_1$. Similarly, the alarm $D_{15}$ in $V_2$ is another example of the newly generated alarm, however, due to change in POI, here 'change in POI', means that the line 13 in $V_1$ has been changed in $V_2$, and as a result of this change, the alarm at line 13 also has changed from safe POI to an alarm.

In the next step at (404), the method (400) includes computing a set of repeated alarms from amongst the set of alarms wherein each of the repeated alarms repeats across the source code version $V_2$ and the previous version of the source code $V_1$.

In an embodiment, a delta alarm $\phi$ generated on $V_2$ is classified as a repeated alarm $(\emptyset_{l,v}^P)$ of a property p if an expression e in $V_1$ is corresponding expression of a POI of the alarm poi($\phi$), and an alarm similar to $\phi$ is generated for e in $V_1$ on line l. The similar alarm generated in $V_1$ for a repeated alarm, i.e. the alarm in $V_1$ generated for the expression corresponding to the POI of the alarm in $V_2$, is called corresponding alarm of the repeated alarm. The generation or classification of repeated alarms can be explained using the $V_1$ and $V_2$, wherein the alarms $A_{22}$ and $A'_{22}$ in $V_2$ and $V_1$ respectively, are corresponding alarms, as the POI is same for both the alarms and their expressions are corresponding expressions $V_1$ and $V_2$.

In the next step at (406), the method (400) includes computing a set of impacting code changes and each of the repeated alarms, using an impact analysis technique, wherein the impact code analysis technique identifies any code changes that impact the repeated alarms. In an embodiment, the impacting code changes for each of the repeated alarm are the code changes that can affect values of a set of variables in the POI of the repeated alarm.

In an embodiment, the impact analysis technique is implemented based on computing a set of modified transitive data and a set of control dependencies for each of the alarms, wherein each of the modified data and the control dependency belongs to a transitive closure of data and a control dependencies of the POIs of the delta alarms, and its expression is modified during the changes between the two versions. In an embodiment, the modified data and control dependencies are below:

For a given expression e in the source code $V_2$, if cdDepTransClosure(e,V) be a set of transitive closure of data and a set of control dependencies of e in V. The data and control dependencies in cdDepTransClosure(e,V) correspond to the program statements which appear in a backward slice generated for the e, and vice versa. The dependency of e to refer to a data or a control dependency that appears in the transitive closure of data and the control dependencies of e along with the impact analysis technique computes each of the transitive control and the data dependency whether it is modified or not during the changes between the two versions. A data dependency d in cdDepTransClosure($e_1,V_1$) (resp. cdDepTransClosure($e_2,V_2$) is modified only if assignExpr(d) is deleted (resp. added) or changed between $V_1$ and $V_2$. Similarly, a control dependency $\upsilon \rightarrow v$ in cdDepTransClosure($e_1,V_1$) (resp. cdDepTransClosure($e_2,V_2$)) is modified if label($\upsilon \rightarrow v$) is changed, or condExpr ($\upsilon$) is deleted (resp. added) or changed.

For each of the repeated alarm $\emptyset_{l_2,v_2}^P$, there exists a similar alarm $\emptyset_{l_1,v_1}^P$ corresponding to it where $l_1$ and $l_2$ are corresponding lines. The two alarms $\emptyset_{l_1,v_2}^P$ and $\emptyset_{l_2,v_2}^P$ are called corresponding alarms.

In the next step at (408), the method (400) includes computing a set of impacted alarms from amongst the repeated alarms, wherein an impacted alarm has one or more impacting code changes.

In an embodiment, the impacting code changes of the repeated alarms are also computed as modified dependencies in the transitive closure of data and control dependencies of the repeated alarms. Therefore, the repeated alarms that cannot be suppressed by the delta alarms computation technique constitute the impacted alarms, wherein the set of impacted alarms from amongst the repeated alarms are computed based on one or more impacting code changes, that is, the modified dependencies in the transitive closure of data and control dependencies of the repeated alarms. The computation of each of the repeated alarm either as impacted or non-impacted based on the modified dependencies is described below.

In an embodiment, if $\emptyset_{l_2,v_2}^P$ is a repeated alarm of a property p generated at a line $l_2$ in the source code $V_2$ with alarm $\emptyset_{l_1,v_1}^P$ its corresponding alarm in the previous version of the source code $V_1$, where $\emptyset_{l_1,v_1}^P$ is generated for the same property at a line $l_1$ in and the previous version of the source code $V_1$. Therefore, the identification of a repeated alarm $\emptyset_{l_2,v_2}^P$ as an impacted alarm is based on the modified dependencies in cdDepTransClosure(poi($\emptyset_{l_2,v_2}^P$),$V_2$) and cdDepTransClosure(poi($\emptyset_{l_1,v_1}^P$),$V_1$). A repeated alarm $\emptyset_{l_2,v_2}^P$ with $\emptyset_{l_1,v_1}^P$ as its corresponding alarm in $V_1$ is identified as an impacted alarm if at least one of the dependencies in cdDepTransClosure(poi($\emptyset_{l_2,v_2}^P$),$V_2$) or cdDepTransClosure (poi($\emptyset_{l_1,v_1}^P$),$V_1$) is modified. Presence of a modified dependency is also checked in cdDepTransClosure(poi($\emptyset_{l_1,v_1}^P$), $V_1$), because checking the presence of a modified dependency only in cdDepTransClosure(poi($\emptyset_{l_2,v_2}^P$),$V_2$) does not capture deletion of a data dependency from $V_1$.

In the next step at (410), the method (400) includes constructing a set of delta alarms by the delta alarms constructer (206) using the newly generated alarms and the impacted alarms.

In an embodiment, an use case example for set of delta alarms using the newly generated alarms and the impacted alarms can be explained using the sample source code( ) and the sample previous version of the source code ( ), wherein the newly generated delta alarm are $A_{22}$, $A_{25}$, and $D_{29}$, the repeated alarms are $A_{22}$, $A_{25}$, and $D_{29}$, the impacted alarms are $A_{22}$, $A_{25}$, and $D_{29}$ and the delta alarms are $A_{22}$, $A_{25}$, $D_{29}$, $A_{27}$, $D_{15}$ and $D_{13}$.

According to an embodiment of the disclosure, the system for identification and elimination of false positives from delta alarms (100) further comprises the false positives identifier (208) configured for identifying, by one or more hardware processors, a plurality of false positives from the set of delta alarms. The false positives identifier (208) receives the set of delta alarms computed, the previous version of the source code $V_1$ and the source code $V_2$, the code mapping created by the code mapping constructer, and the input AFPE results on the previous version of the code $V_1$, to eliminate false positives from the delta alarms.

In one embodiment, the false positives identifier (208) comprises several modules that implement the step of identification of false positives include the assertions generator (210), the annotated code module (212) that includes the annotated code generator (214) and the annotated code pre-processor (216), the assertions verifier (218), the reuse computer (220), the verification tool (222) and the false positives identification module (224) that are as explained in below sections.

In one embodiment, the assertions generator (210) in the false positives identifier (208) that is configured for generating an assertion for each of the delta alarms. The assertion is generated corresponding to each delta alarm, is such that the assertion holds, i.e., the condition of the assertion always evaluates to true only if the alarm is a false positive and vice versa. In other words, whenever the assertion fails, i.e., its condition evaluates to false, there is an error at the corresponding alarm's POI. In an embodiment, considering an example of the sample previous version of the source code $V_1$ and the sample source code $V_2$, the conditions of the assertions generated for $D_{13}$ and $D_{29}$ respectively are p!=0 and t!=0. Furthermore, the conditions of the assertions generated for $A_{22}$ and $A_{25}$ respectively are (x≥0 && x≤49), (y≥0 && y≤49). Therefore, when an assertion is found to hold, it never evaluates to false, the corresponding alarm is identified by the false positives identifier (208) and eliminated later by the false positives eliminator (226).

In one embodiment, the false positives identifier (208) in the system (100) further comprises an annotated code module (212) that further comprises of the annotated code generator (214) and the annotated code pre-processor (216). The annotated code generator (214) is configured for generating at least one annotated code based on an annotation technique, wherein each of the annotated code comprises of at least one assertion and the annotated code pre-processor (216) that is configured for pre-processing each of the annotated code based on a set of pre-processing techniques, wherein the set of pre-processing techniques is selected based on a dynamic configuration input.

The annotated code generator (214) is configured for generating at least one annotated code based on an annotation technique, wherein each of the annotated code comprises of at least one assertion. The annotation technique generates an annotated code as a variant of the source code $V_2$ by inserting a group of related assertions wherein, the group of related assertions are identified by the annotated code generator (214) based on a set of common or related variables in the assertion expressions, or/and based on the set of a common or related transitive data and control dependencies of the delta alarms for which the assertions are generated; wherein the assertions having a common or a related variable, or a common/related transitive data and a control dependencies are added to a same group. Furthermore, the annotated code generator (214) is configured, based on a dynamic configuration input, to enable or disable the grouping of assertions, wherein when the grouping is disabled, each of the group of assertions formed includes single assertion in it.

The annotated code pre-processor (216) that is configured for pre-processing each of the annotated code based on a set of pre-processing techniques, wherein the dynamic configuration input is a real-time and dynamic input from a machine input or a user input. In an embodiment, the set of pre-processing techniques include well known techniques such as a slicer based pre-processing technique, a loop abstractor based pre-processing techniques, or the pre-processing step may not be performed for an annotated code. The pre-processing techniques are selected based on the dynamic configuration input, wherein a real-time and a dynamic input from a machine input or a user input is received to decide the technique for pre-processing or not to perform the preprocessing.

In one embodiment, the false positives identifier (208) in the system (100) further comprises the assertions verifier (218) that is configured for verifying the assertions in each of the pre-processed annotated code by iteratively identifying at least one verification call, wherein the verification call is based on a verification context provided as an input function from the pre-processed annotated code. The iterative identification of verification calls by the assertions verifier (218) is to overcome the issue of non-scalability of the verification tools on large code, and they can be identified based on a context expansion technique.

In an embodiment, in the context expansion technique, a verification call is represented as mcall($\Pi$, $f$) (also referred to as a model checking call) verifies the assertions generated corresponding to a set of delta alarms $\Pi$ and in a verification context of a function $f$. Since the verification context in a verification call is specified as the entry function to verify the assertions, the terms verification context and function are interchangeably used. A code included by a verification context provided as input for a verification call is same as the code included by the context function and the functions that are directly or indirectly called by the context function. In one embodiment, before making each of the verification call mcall($\Pi$, $f$) to the verification tool, the assertions verifier (218) is configured to slice the pre-processed annotated code assuming function $f$ as the entry-point (function-level slicing). Therefore, when a verification call can be skipped on computing it as reusable verification call, the function level slicing before it also can be skipped. Therefore, the term verification call is used to mean, the call to a slicer for the function-level slicing and the subsequent call to a model checker/verification tool.

In one embodiment, the false positives identifier (208) in the system (100) further comprises the reuse computer (220) that is configured for computing a set of reusable verification calls and a set of non-reusable verification calls from the one or more verification calls identified by the assertions verifier (218) in iterations as described above. The computation of the set of reusable verification calls and the set of non-reusable verification calls by the reuse computer (220) is based on a set of reuse computation techniques using the delta alarms corresponding to the assertions in the annotated code, the verification context, and the AFPE results from the previous version source code ($V_1$). The reuse computation techniques include the conservative reuse technique and the aggressive reuse technique, one of which is selected based on the dynamic configuration input.

In an embodiment, working of each of the reuse computation techniques is described below. As explained during the computation of each of the repeated alarms generated on the source code $V_2$ as an impacted alarm, there exists unique similar alarm (in the previous version of the source code $V_1$) corresponding to the repeated alarm. The repeated alarm $\emptyset$ (generated on the source code $V_2$) is identified as an impacted alarm if at least one of the dependencies in cdDepTransClosure(poi($\emptyset$),$V_2$) or cdDepTransClosure(corrAlarm($\emptyset$),$V_1$) is modified; wherein corrAlarm($\emptyset$) represents the delta alarm generated on the source code $V_1$ and is corresponding alarm of the repeated alarm $\emptyset$.

In an embodiment, one of the criteria used to compute a verification call as reusable or non-usable, by the reuse computation techniques, is to compute whether any of the annotated code included by the verification context function is changed or not. For a verification function/context $f$ in a model checking call mcall($\Pi$, $f$) that verifies assertions generated corresponding to a set of impacted alarms $\Pi$, any of the code included by the verification context function $f$ is changed or not changed (during the code changes between the two versions $V_1$ and $V_2$) can be computed by checking if any of the statements in the function $f$ or any of the functions that are directly or indirectly called by $f$. However, this computation approach can identify the context function $f$ as changed even though the changes made are not impacting to the impacted alarms $\Pi$, because this computation is independent of the delta alarms $\Pi$. Therefore, if this technique is used by the reuse computation techniques, the number of reusable verification calls than the ones can be identified, and as a result efficiency in the AFPE obtained will be lesser than what can be obtained. Further, a verification context $f$ of mcall($\Pi$, $f$) is changed or not can be computed by generating the backward slice for impacted alarms $\Pi$ on $V_2$ and the backward slice for corrAlarms($\Pi$) on $V_1$, and checking if the two slices are same or not, wherein the same slices denotes the verification context is changed. However, this method to compute whether the context is changed or not is not efficient. Therefore, for a verification call mcall($\Pi$, $f$), the reuse computation techniques implement more precise method to compute whether the verification context $f$ is changed or not changed, wherein the method is based on checking whether any of the impacting changes of the impacted alarms $\Pi$ are included in $f$ or any of the functions that are directly or indirectly called by $f$. The following sections describe details to identify if a verification context has changed or not changed using the reuse computation techniques.

For a given set of impacted alarms $\Pi$, the collection of all the modified dependencies computed for each of the impacted alarms in $\Pi$ is denoted as modDeps($\Pi$), Notation corrAlarms($\Pi$) is used to denote the set of delta alarms generated on the previous version of source code $V_1$, wherein the set of alarms includes only the corresponding alarm of each of the impacted alarms $\Pi$. Further, modDeps (corrAlarms($\Pi$)) denoted the collection of all the modified dependencies of each of the corresponding alarms in corrAlarms($\Pi$). Further, for a function $f$, notation, $f^*$ is used to denote a set of functions, that includes $f$ and the functions that are directly or indirectly called by $f$ and notation funcs(modDeps($\Pi$)) is used to denote the functions in which the modified dependencies of impacted alarms $\Pi$ appear. That is, the functions in funcs(modDeps($\Pi$)) appear on a backward slice of $\Pi$ and are changed between the source code and the previous version of the source code. The notation slice($\Pi$, $f$) denotes the backward slice generated for a given set of delta alarms $\Pi$ and with a function $f$ as an entry function. The slices generated for a given set of impacted alarms $\Pi$ and their corresponding alarms on $V_1$ represented as slices slice($\Pi$, $f$) slice(corrAlarms($\Pi$), $f$). Further the slice($\Pi$, $f$) and slice(corrAlarms($\Pi$), $f$) are identified as identical only if the following two conditions are satisfied:

1. funcs(modDeps(Π))∩ƒ*=∅ and data types of the variables used in the functions ƒ* are not changed, on the source code $V_2$, and
2. funcs(modDeps(corrAlarm(Π)))∩ƒ*=∅ and data types of the variables used in the functions ƒ* are not changed, on the previous version of source code $V_1$.

Summarizing the above conditions—if none of the functions in ƒ* have a statement which corresponds to a modified dependency of any of the alarms in Π on $V_1$, and none of the functions in ƒ* have a statement which corresponds to a modified dependency of any of the alarms in corrAlarms(Π), the two slices slice(Π, ƒ) and slice(corrAlarms(Π), ƒ) are identical. For efficiency of computation of two slices are identical, the checking of whether data types of the variables used in the functions ƒ* are changed or not can be skipped, and therefore this check is configurable.

If the slices generated for a set of impacted alarms Π, slice(Π, ƒ) and slice(corrAlarms(Π), ƒ) are not identical, the verification context ƒ is computed as changed by the reuse computation techniques, otherwise the context is not changed. This computation of change in the verification context is with respect to impacted alarms Π, wherein the verification context is identified as changed only if the change impacts at least one alarm in Π, which is used by the reuse computation techniques to compute whether the context ƒ of a verification call mcall(Π, ƒ) is changed or not changed.

In an embodiment, the reuse computation techniques determine if a verification call denoted using the mcall(Π, ƒ), is a reusable verification call or a non-reusable verification call, wherein the determining is based on whether the verification context ƒ is changed or not, and based on the other criteria. Depending on the other criteria used to determine a verification call as a reusable verification call or a non-reusable verification call varies, the reuse based techniques are classified as conservative reuse technique and aggressive reuse technique. Based on a dynamic configuration input, one of these reuse computation techniques is selected. Each of these reuse computation techniques are described below.

In one embodiment, the conservative reuse technique implemented using the reuse computer (220) includes identifying a verification call as a reusable verification call or a non-reusable verification call based on the delta alarms corresponding to the assertions to be verified and the verification context.

In an embodiment, the conservative reuse technique computes the set of a reusable verification call or a non-reusable verification call from the identified verification calls, by computing each of the verification calls, denoted as mcall(Π, ƒ) with Π as the set of delta alarms, is a reusable or not. The verification call mcall(Π, ƒ) is computed as reusable verification call, by the conservative reuse technique, if all alarms in Π are impacted alarms, and the verification context ƒ is not changed, wherein the change in the context function ƒ is determined by computing whether the two slices slice (Π, ƒ) and slice(corrAlarms(Π), ƒ) are identical. Otherwise (if the two conditions are not satisfied, the verification call mcall(Π, ƒ) is computed, by the conservative reuse technique, as non-reusable verification call. The conservative reuse technique identifies the verification call as non-reusable verification when the verification context is changed, because verification results of the mcall(Π, and mcall(corrAlarms(Π), ƒ) cannot be the same as the context has been changed. Furthermore, when the set of delta alarms Π includes a newly generated alarm, the assertion corresponding to it needs to be verified by making the verification call to the model checker, and therefore the verification call is identified as non-reusable verification call. Consider the example of the sample source code ($V_2$) and the sample previous version of source code ($V_1$), wherein the verification call mcall({$A_{25}$, $D_{29}$}, bar) is identified as a reusable verification call, while the verification call mcall({$A_{25}$, $D_{29}$}, foo) is identified as a non-reusable verification call by the conservative reuse technique.

In one embodiment, when a verification call mcall(Π, ƒ) is computed as reusable by the conservative reuse technique, the result of this reusable call, that is the result for verifying the assertion corresponding to each of the impacted alarm ∅ in Π is computed as the result of verifying its corresponding alarm corrAlarm(∅) in the same verification context ƒ during the AFPE on $V_1$. That is, there exists a one to one mapping of the verification results for the assertions that are be verified by a reusable verification call mcall(Π, ƒ) and the results of verifying the corresponding alarms in $V_1$.

In one embodiment, the aggressive reuse technique implemented using the reuse computer (220) includes identifying a verification call as a reusable verification call or a non-reusable verification call based on the delta alarms corresponding to the assertions to be verified, the verification context of the verification call, and the AFPE results of the previous version of the code $V_1$. The disclosed aggressive reuse technique is an aggressive variant of the conservative reuse technique, to reduce the number of verification calls that result in a time out or out of memory. The aggressive reuse technique enables identification of verification calls that result in time outs as reusable verification calls and skips them to provide more efficiency. Therefore, the aggressive reuse technique computes more verification calls as reusable than the verification calls computed by the conservative reuse technique. Although the aggressive reuse technique computes more reusable verification calls, it results in reducing a lesser number of false positives than the false positives that can be eliminated if the reusable verification calls are identified by the conservative approach.

In an embodiment, the aggressive reuse technique computes the set of reusable verification calls and a set of non-reusable verification calls from the identified verification calls, by computing each of the verification calls, denoted as mcall(Π, ƒ) with Π as a set of delta alarms, is a reusable verification call or non-reusable verification call, wherein the computation of the verification call mcall(Π, ƒ) as reusable verification call or non-reusable verification call is described in the following section.

a. verification call mcall(Π, ƒ) is computed as reusable by the aggressive reuse technique if all the delta alarms in Π are impacted alarms, and the verification context ƒ is not changed (i.e., the two slices slice(Π, ƒ) and slice (corrAlarms(Π), ƒ) are identical). In this case of identifying mcall(Π, ƒ) as reusable verification call, the result for this reusable verification call, that is the results of verifying the assertion corresponding to each of the impacted alarm ∅ in Π is computed as the result of verifying its corresponding alarm corrAlarm(∅) in the same verification context ƒ during the AFPE on $V_1$ (one to one mapping of the verification results for the assertions of the alarms Π).

b. Furthermore, the aggressive reuse technique computes the verification call mcall(Π, ƒ) as reusable verification call if all alarms in Π are impacted alarms, the verification context ƒ is changed (the two slices slice(Π, ƒ) and the slice(corrAlarms(Π), ƒ) are not identical), and the results of verifying the corresponding assertions in the ƒ on $V_1$ includes at least one time-out (TO), or at least one out of memory (OM), or all counter examples. In this case, the result of this reusable verification call, that is result of verifying each of the assertions (generated for Π) in $f$ is same and respectively is time-out, out of memory, and counterexamples.

c. Furthermore, the aggressive reuse technique computes a verification call mcall(Π, $f$) as reusable verification call if Π has at least one impacted alarm and at least one newly generated alarm, the verification context $f$ is not changed (the two slices slice(Π, $f$) and slice(corrAlarms(Π), $f$) are identical), and the results of verifying the corresponding assertions in $f$ on $V_1$ includes at least one time-out (TO) or out of memory (OM). In this case, the result of this reusable verification call, that the result of verifying each of the assertions (generated for Π) in $f$ is same and respectively is time-out and out of memory.

d. The aggressive reuse technique computes a verification call mcall(Π, $f$) as non-reusable verification call if it is not identified as reusable in any of the three cases (a), (b), and (c) described above.

Referring to the example of the delta alarm shown in the sample source code ($V_2$) and the sample previous version of source code ($V_1$), the verification call mcall({$A_{25}$, $D_{29}$}, bar) gets computed as a reusable verification call, whereas the verification call mcall({$A_{25}$, $D_{29}$}, foo) gets computed as a non-reusable verification call by the aggressive reuse technique.

The Table. 1 summarizes the computation of reusable and non-reusable verification calls using the conservative reuse technique and the aggressive reuse technique, to identify if a mcall(Π, $f$) is a reusable verification call or non-reusable verification call:

TABLE 1

Summary of reuse computation techniques

| Status of delta alarms | Context change status for f (computed based on comparing the slices generated for impacted alarms in Π) | AFPE results of the earlier version $V_1$ | Computation of a verification call mcall(Π, f) as reusable/non- reusable verification call | |
|---|---|---|---|---|
| | | | Conservative reuse technique | Aggressive reuse technique |
| (Π) in a verification call mcall(Π, f) | | | | |
| All alarms impacted | Not changed | — | Reusable (results are mapped) | Reusable (results are mapped) |
| | Changed | Contains at least one time out and out of memory | Non-reusable | Reusable (time out or out of memory) |
| | | All results are counterexamples | Non-reusable | Reusable (Counter-examples) |
| | | All the other cases | Non-reusable | Non-Reusable |
| At least one alarm in is a newly generated alarm and at least one is impacted alarm | Not changed | Contains at least one time out and out of memory | Non-reusable | Reusable (time out or out of memory) |
| | | Does not contain time out and out of memory | Non-reusable | Non-reusable |
| | Changed | — | Non-reusable | Non-reusable |

TABLE 1-continued

Summary of reuse computation techniques

| Status of delta alarms | Context change status for f (computed based on comparing | AFPE results of the | Computation of a verification call mcall(Π, f) as reusable/non- reusable verification call | |
|---|---|---|---|---|
| | | | Conservative reuse technique | Aggressive reuse technique |
| (Π) in a verification call mcall(Π, f) | the slices generated for impacted alarms in Π) | corresponding alarms on the earlier version $V_1$ | | |
| All alarms are newly generated | — | — | Non-reusable | Non-reusable |

The below section/points summarize and compare the two reuse computation techniques—conservative reuse technique and the aggressive reuse technique.

a. The conservative reuse technique and the aggressive reuse technique, both identify a verification call mcall (Π, $f$) as reusable verification call when all the alarms in Π are impacted, and the verification context $f$ is not changed.

b. The conservative reuse technique identifies a verification call mcall(Π, $f$) as non-reusable verification call when all the delta alarms in Π are newly generated, irrespective of whether the verification context $f$ is changed.

c. The aggressive reuse technique identifies a verification call mcall(Π, $f$) as reusable verification call when the AFPE results on the previous version contains at least one time out or out of memory, irrespective of whether the verification context $f$ is changed.

The reuse computation technique is selected among the conservative reuse technique and the aggressive reuse technique based on the dynamic configuration input. The dynamic configuration input is a real-time and a dynamic input from a machine input or a user input is received to decide the reuse computation technique to be selected among the conservative reuse technique and the aggressive reuse technique. The dynamic configuration input can decide between the reuse computation technique based on their requirement, wherein the aggressive reuse technique identifies more model checking calls for which results can be reused, however the conservative reuse technique is more efficient with respect to elimination of false positives.

According to an embodiment of the disclosure, the system for identification and elimination of false positives from delta alarms (100) further comprises the verification tool (222) within the false positives identifier (208) that is configured to receive verification calls for the non-reusable verification calls to share a set of verification results of non-reusable verification calls. The verification tool (222) is an analysis tool for verifying assertions based on techniques that include a model checking, a symbolic execution, a theorem proving and a deductive verification.

In an embodiment, the reuse computer (220) is also configured for obtaining a set of verification results of reusable verification calls from the reuse computer (220), and a reusable verification call obtaining a set of verification results of the non-reusable verification calls from the verification tool (222). The assertions verifier (218) is also further configured to iteratively compute next set of verification calls for the same annotate code using the obtained results of the reusable verification calls and non-reusable verification calls.

According to an embodiment of the disclosure, the system for identification and elimination of false positives from delta alarms (100) further comprises a false positives identification module (224) that is configured for identifying a plurality of false positives in the delta alarms corresponding to the assertions in the annotated code. The false positive identification is based on the verification results of the non-reusable verification calls and the verification results of the reusable verification calls.

According to an embodiment of the disclosure, the system for identification and elimination of false positives from delta alarms (100) further comprises the false positives eliminator (226) that is configured for eliminating, by one or more hardware processors, the false positives from the set of delta alarms, wherein the false positives are identified by the false positive identification module (224).

According to an embodiment of the disclosure, the system for identification and elimination of false positives from delta alarms (100) further comprises the report display module (228) configured for displaying the delta alarms remaining after the elimination of the false positives, wherein the displaying includes reporting the delta alarms remaining after the elimination of the false positives.

In an embodiment, the system (100) comprises one or more data storage devices or the memory 110 operatively coupled to the processor(s) 108 and is configured to store instructions for execution of steps of the method 500 by the processor(s) or one or more hardware processors 108. The steps of the method of the present disclosure will now be explained with reference to the components of the system identification and elimination of false positives from delta alarms (100) and the modules (202-228) as depicted in FIG. 2, and the flow diagrams as depicted in FIG. 1 through FIG. 5D. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 5A through FIG. 5D, with reference to FIG. 1, is an exemplary flow diagram illustrating a method X00 for identification and elimination of false positives from delta alarms using the system (100) of FIG. 1 according to an embodiment of the present disclosure.

At step 502 of the method 500, includes receiving, by one or more hardware processors, a plurality of input data from a plurality of sources, wherein the plurality of input data comprises a source code ($V_2$) from a plurality of source codes, a previous version of the source code ($V_1$), a static analysis results of the previous version of the source code ($V_1$) and an AFPE results of the previous version of the source code ($V_1$)

In the next step at 504 of the method 500, includes generating, by one or more hardware processors, a set of alarms from the source code ($V_2$), based on analysis of the source code ($V_2$) using at least one static analysis tool, via the one or more hardware processors in the static alarms generator (202).

In the next step at 506 of the method 500, includes constructing, by one or more hardware processors, a code map using the source code ($V_2$) and the previous version of the source code ($V_1$), based on a code mapping technique, via the one or more hardware processors in the code mapping constructor (204).

In the next step at 508 of the method 500, includes constructing, by one or more hardware processors, a set of delta alarms from amongst the set of alarms, using a delta alarms identification technique in the delta alarms constructor (206) based on the code map and the static analysis results of the previous version of the source code ($V_1$), wherein the set of delta alarms comprise of a plurality of newly generated alarms and a plurality of impacted alarms.

In the next step at 510 of the method 500 includes identifying, by one or more hardware processors, a plurality of false positives from the set of delta alarms in the false positives identifier (208). In one embodiment, the step of identification of false positives includes the following steps;

At step 510A, the method (500) includes generating an assertion for each of the delta alarms by the assertions generator (210) within the annotated code module (212).

In the next step at 5106, the method (500) includes generating at least one annotated code based on an annotation technique in the annotated code generator (214) within the annotated code module (212), wherein each of the annotated code comprises of at least one assertion.

In the next step at 510C, the method (500) includes pre-processing each of the annotated code based on a set of pre-processing techniques in the annotated code pre-processor (216) in the annotated code module (212), wherein the set of pre-processing techniques is selected based on a dynamic configuration input.

In the next step at 510D, the method (500) includes identifying iteratively at least one verification call to a verification tool in the assertions verifier (218), wherein the verification call is based on a verification context provided as an input function from the pre-processed annotated code;

In the next step at 510E, the method (500) includes computing a set of reusable verification calls and a set of non-reusable verification calls from the identified verification calls by the reuse computer (220) within the false positives identifier (208) based on a reuse computation technique using the delta alarms corresponding to the assertions in the annotated code, the verification context, and the AFPE results from the previous version source code ($V_1$), wherein the reuse computation technique includes a conservative reuse technique or an aggressive reuse technique.

In the next step at 510F, the method (500) includes making the verification calls to a verification tool by the assertions verifier (218) for the set of non-reusable verification calls to obtain a set of verification results of non-reusable verification calls from the verification tool (222)

In the next step at 510G, the method (500) includes obtaining a set of verification results of reusable verification calls based on the AFPE results on the previous version of the source code by the reuse computer (220) within the false positives identifier (208).

In the next step at 510H, the method (500) includes identifying a plurality of false positives in the delta alarms corresponding to the assertions in the annotated code based on the verification results of the non-reusable verification calls and the verification results of the reusable verification calls by the false positive identification module (224) within the false positives identifier (208).

In the next step at 512 of the method 500, eliminating, by one or more hardware processors, the false positives from the set of delta alarms by the false positives eliminator (226) and displaying the delta alarms remaining after the elimination on a report display screen (228), wherein the displaying includes reporting the delta alarms remaining after the elimination of the false positives.

Experimental Results

The experimental setup used to evaluate the disclosed technique proposed for improving the AFPE efficiency along with the evaluation results is listed below.

Experimental Setup

Implementation to evaluate the disclosed method and system for identification and elimination of false positive along with a series of state-of-the-art techniques that have been proposed for the AFPE. The steps performed (in abstract terms) include grouping of related assertions to reduce the overall number of models checking calls by processing related assertions together. Further for scalability of model checking, the code is sliced with respect to assertions in each group using backward slicing. The code slices generated for each group are then pre-processed using techniques that over-approximate loops. The assertions in the over-approximated code are verified using context expansion approach. Further, CBMC, a model checker is used to verify the assertions in the pre-processed annotated code.

The disclosed technique of method and system for identification and elimination of false positive is implemented in three different settings:

1. Original: AFPE in the original setting, i.e., without applying any of the reuse computation technique to improve the AFPE efficiency through identification of reusable and non-reusable verification calls.
2. Conservative: AFPE in which the reusable verification calls are computed using the conservative reuse computation technique.
3. Aggressive: AFPE in which the reusable verification calls are computed using the aggressive reuse technique.

Evaluation Results:

Selection of applications and alarms is represented in Table 2 as shown below with the applications and their versions selected to evaluate the technique. The versions of the selected applications are analyzed for AIOB verification property, using TCS ECA, a commercial static analysis tool. Delta alarms are computed from alarms generated by TCS ECA using impact analysis-based VSAT, and performed grouping of related assertions generated for the delta alarms. The third column in the table presents the number of groups of related assertions on each version. The other columns present the model checking (verification calls) to made to the verification tool (CBMC), total time taken by these verification calls, and the number of false positives eliminated in the three AFPE settings: original, conservative, and aggressive.

TABLE 2

Evaluation results

| Application | Version | Groups of related assertions | Model checking cells | | | Total time taken | | | False positives eliminated | | |
| --- | --- | --- | --- | --- | --- | --- | --- | --- | --- | --- | --- |
| | | | Original | % reduction | | Original | % reduction | | Original | Conservative | Aggressive |
| | | | | Conservative | Aggressive | | Conservative | Aggressive | | | |
| Archimedes | 0.1.0 | 109 | 128.00 | 40.60 | 87.50 | 3459.00 | 31.00 | 72.6 | 1 | 1 | 0 |
| Archimedes | 0.1.1 | 111 | 139.00 | 86.30 | 94.20 | 3434.00 | 64.50 | 79.1 | 1 | 1 | 1 |
| Archimedes | 0.1.2 | 112 | 134.00 | 84.30 | 95.50 | 3505.00 | 54.20 | 81.3 | 1 | 1 | 1 |
| Archimedes | 0.1.3 | 109 | 131.00 | 92.40 | 100.00 | 3730.00 | 70.70 | 84.6 | 1 | 1 | 1 |
| Archimedes | 0.1.4 | 109 | 131.00 | 92.40 | 100.00 | 3693.00 | 70.60 | 84.7 | 1 | 1 | 1 |
| Archimedes | 0.7.0 | 112 | 134.00 | 91.80 | 99.30 | 3712.00 | 70.90 | 84.9 | 1 | 1 | 1 |
| Archimedes | 1.0.0 | 112 | 134.00 | 100.00 | 100.00 | 3713.00 | 96.60 | 96.6 | 1 | 1 | 1 |
| Archimedes | 1.2.0 | 105 | 127.00 | 62.20 | 75.60 | 3471.00 | 37.30 | 61.7 | 1 | 1 | 1 |
| Archimedes | 1.5.0 | 110 | 132.00 | 99.20 | 100.00 | 3585.00 | 96.00 | 94.5 | 1 | 1 | 1 |
| Archimedes | 2.0.0 | 137 | 165.00 | 74.50 | 80.00 | 4637.00 | 54.10 | 66.5 | 1 | 1 | 1 |
| smp_utils | 0.90 | 37 | 78.00 | 39.70 | 100.00 | 24807.00 | 3.50 | 98.6 | 27 | 26 | 26 |

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

The embodiments of present disclosure herein address the problem of identification and elimination of false positives during static analysis of an application code. The embodiment thus provides a method and a system for identification and elimination of false positives from delta alarms. Moreover, the embodiments herein further provides a method and a system for identification and elimination of false positives from delta alarms, wherein the delta alarms are post-processed to identify of a set of false positives using a version aware static analysis technique based on a set of reuse computation techniques implementing conservative or an aggressive approach based on a dynamic configuration input.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein.

I claim:

1. A processor-implemented method for identification and elimination of false positives from delta alarms, the method comprising:

receiving, by one or more hardware processors, an input data from a plurality of sources, wherein the input data comprises a source code from a plurality of source codes, a previous version of the source code, a static analysis results of the previous version of the source code and an automated false positives elimination (AFPE) results of the previous version of the source code;

generating, by one or more hardware processors, a set of alarms on the source code, based on analysis of the source code using at least one static analysis tool, via the one or more hardware processors;

constructing, by the one or more hardware processors, a code map using the source code and the previous version of the source code, based on a code mapping technique, via the one or more hardware processors;

constructing, by the one or more hardware processors, a set of delta alarms from amongst the set of alarms, using a delta alarms identification technique based on the code map and the static analysis results of the previous version of the source code, wherein the set of delta alarms comprises a plurality of newly generated alarms and a plurality of impacted alarms;

identifying, by the one or more hardware processors, a plurality of false positives from the set of delta alarms, wherein identifying the plurality of false positives comprises: generating an assertion for each the delta alarms from amongst the set of delta alarms;

generating at least one annotated code based on an annotation technique, wherein each of the annotated code comprises at least one assertion;

pre-processing each of the annotated code based on a set of pre-processing techniques to obtain at least one pre-processed annotated code, wherein the set of pre-processing techniques is selected based on a dynamic configuration input;

identifying iteratively at least one verification call for the assertions in each of the pre-processed annotated code, wherein the verification call is based on a verification context provided as an input function from the pre-processed annotated code;

computing a set of reusable verification calls and a set of non-reusable verification calls from the identified verification calls based on a reuse computation technique using the delta alarms associated to the assertions in the annotated code, the verification context, and the AFPE results from the previous version source code, wherein the reuse computation technique includes a conservative reuse technique or an aggressive reuse technique;

making the verification calls to a verification tool for the set of non-reusable verification calls to obtain a set of verification results of non-reusable verification calls; and obtaining a set of verification results of reusable verification calls based on the AFPE results on the previous version of the source code; and identifying a plurality of false positives in the delta alarms corresponding to the assertions in the annotated code based on the set of verification results of the non-reusable verification calls and the set of verification results of the reusable verification calls; and eliminating, by one or more hardware processors, the false positives from the set of delta alarms to obtain a set of delta alarms remaining after the elimination and displaying the remaining delta alarms on a display screen.

2. The method of claim 1, the source code and the previous version of the source code comprises a plurality of lines and a set of associated tokens for each of the lines.

3. The method of claim 1, wherein constructing the code map based on the code mapping technique comprises:
identifying a plurality of lines and a plurality of tokens deleted from the previous version of the source code;
identifying a plurality of lines and a plurality of tokens added to the source code;
identifying a plurality of unchanged lines and a plurality of unchanged tokens from the source code and the previous version of the source code;
identifying a plurality of changed line and a plurality of changed token from the source code and the previous version of the source code; and
constructing the code map using the identified unchanged lines, the identified unchanged tokens, the identified changed lines and the identified changed tokens.

4. The method of claim 1, wherein the delta alarms identification technique is based on a version aware static analysis technique that includes the following steps:
computing a set of newly generated alarms from amongst the set of alarms wherein each of the newly generated alarms is generated for the first time on the source code without having the same alarm on a correspondingly mapped line in the previous version of the source code;
computing a set of repeated alarms from amongst the set of alarms wherein each of the repeated alarms repeats across the source code version and the previous version of the source code;
computing a set of impacting code changes for each of the repeated alarms, using an impact analysis technique, wherein the impact analysis technique identifies any code changes that impact each of the repeated alarms;
computing a set of impacted alarms from amongst the repeated alarms, wherein an impacted alarm has one or more impacting code changes; and
constructing a set of delta alarms using the newly generated alarms and the impacted alarms.

5. The method of claim 1, wherein the annotation technique is based on a context expansion technique that generates an annotated code as a variant of the source code by inserting a group of related assertions wherein, the group of related assertions are identified based on a set of common variables or a set of related variables in the assertion expressions, and based on a set of common related transitive data or a set of related transitive data and a set of control dependencies of the delta alarms for which the assertions are generated.

6. The method of claim 1, wherein the dynamic configuration input is a real-time and dynamic input from a machine input or a user input.

7. The method of claim 1, wherein the verification tool comprises an analysis tool for verifying the assertions based on one or more of a model checking technique, a symbolic execution technique, a theorem proving technique and a deductive verification technique.

8. The method of claim 1, wherein the reuse computation techniques include the conservative reuse technique and the aggressive reuse technique, one of which is performed based on the dynamic configuration input.

9. The method of claim 1, using the conservative reuse technique to computing a set of reusable verification calls and a set of non-reusable verification calls from the identified verification calls comprises identifying a verification call as one of a reusable verification call and a non-reusable verification call based on delta alarms corresponding to the assertions to be verified and the verification context of the verification call and the aggressive reuse technique for computing a set of reusable verification calls and a set of non-reusable verification calls from the identified verification calls comprises identifying a verification call as a reusable verification call or a non-reusable verification call based on the delta alarms corresponding to the assertions to be verified, the verification context of the verification call, and the AFPE results of the previous version of the code.

10. A system for identification and elimination of false positives from delta alarms, the system comprises:
one or more hardware processors;
an input/output interface;
a memory in communication with the one or more hardware processors, wherein the one or more first hardware processors are configured to execute programmed instructions stored in the one or more first memories, to:
receiving, by one or more hardware processors, an input data from a plurality of sources, wherein the input data comprises a source code from a plurality of source codes, a previous version of the source code, a static analysis results of the previous version of the source code and an automated false positives elimination (AFPE) results of the previous version of the source code;
generating, by one or more hardware processors, a set of alarms on the source code, based on analysis of the source code using at least one static analysis tool, via the one or more hardware processors;

constructing, by the one or more hardware processors, a code map using the source code and the previous version of the source code, based on a code mapping technique, via the one or more hardware processors;

constructing, by the one or more hardware processors, a set of delta alarms from amongst the set of alarms, using a delta alarms identification technique based on the code map and the static analysis results of the previous version of the source code, wherein the set of delta alarms comprises a plurality of newly generated alarms and a plurality of impacted alarms;

identifying, by the one or more hardware processors, a plurality of false positives from the set of delta alarms, wherein identifying the plurality of false positives comprises:

generating an assertion for each the delta alarms from amongst the set of delta alarms;

generating at least one annotated code based on an annotation technique, wherein each of the annotated code comprises at least one assertion;

pre-processing each of the annotated code based on a set of pre-processing techniques to obtain at least one pre-processed annotated code, wherein the set of pre-processing techniques is selected based on a dynamic configuration input;

identifying iteratively at least one verification call for the assertions in each of the pre-processed annotated code, wherein the verification call is based on a verification context provided as an input function from the pre-processed annotated code;

computing a set of reusable verification calls and a set of non-reusable verification calls from the identified verification calls based on a reuse computation technique using the delta alarms associated to the assertions in the annotated code, the verification context, and the AFPE results from the previous version source code, wherein the reuse computation technique includes a conservative reuse technique or an aggressive reuse technique;

making the verification calls to a verification tool for the set of non-reusable verification calls to obtain a set of verification results of non-reusable verification calls;

obtaining a set of verification results of reusable verification calls based on the AFPE results on the previous version of the source code; and identifying a plurality of false positives in the delta alarms corresponding to the assertions in the annotated code based on the set of verification results of the non-reusable verification calls and the set of verification results of the reusable verification calls; and eliminating, by one or more hardware processors, the false positives from the set of delta alarms to obtain a set of delta alarms remaining after the elimination and displaying the remaining delta alarms on a display screen.

11. The system of claim 10, wherein for constructing the code mapping based on the code mapping technique, the one or more hardware processors are further configured by the instructions to:

identifying a plurality of lines and a plurality of tokens deleted from the previous version of the source code;

identifying a plurality of lines and a plurality of tokens added to the source code;

identifying a plurality of unchanged lines and a plurality of unchanged tokens from the source code and the previous version of the source code;

identifying a plurality of changed line and a plurality of changed token from the source code and the previous version of the source code; and constructing the code map using the identified unchanged lines, the identified unchanged tokens, the identified changed lines and the identified changed tokens.

12. The system of claim 10, wherein for computing of the set of delta alarms, the one or more hardware processors are further configured by the instructions to:

computing a set of newly generated alarms from amongst the set of alarms wherein each of the newly generated alarms is generated for the first time on the source code without having the same alarm on a correspondingly mapped line in the previous version of the source code;

computing a set of repeated alarms from amongst the set of alarms wherein each of the repeated alarms repeats across the source code version and the previous version of the source code;

computing a set of impacting code changes for each of the repeated alarms, using an impact analysis technique, wherein the impact analysis technique identifies any code changes that impact each of the repeated alarms;

computing a set of impacted alarms from amongst the repeated alarms, wherein an impacted alarm has one or more impacting code changes; and constructing a set of delta alarms using the newly generated alarms and the impacted alarms.

13. The system of claim 10, wherein for implementing the annotation technique, the one or more hardware processors are further configured by the instructions to generate an annotated code as a variant of the source code by inserting assertions corresponding to a group of related delta alarms, wherein the related delta alarms in a group are related by a set of related variables or/and a set of related data or/and a set of related control dependencies.

14. The system of claim 10, wherein for implementing the conservative reuse technique, the one or more hardware processors are further configured by the instructions to identify a verification call as a reusable verification call or a non-reusable verification call based on the delta alarms corresponding to the assertions to be verified and the verification context of the verification call and for implementing the aggressive reuse technique, the one or more hardware processors are further configured by the instructions to identify a verification call as a reusable verification call or a non-reusable verification call based on the delta alarms corresponding to the assertions to be verified, the verification context of the verification call, and the AFPE results of the previous version of the source code.

15. A non-transitory computer-readable medium having embodied thereon a computer readable program for identification and elimination of false positives from delta alarms, the method wherein the computer readable program, when executed by one or more hardware processors, cause:

receiving, by one or more hardware processors, an input data from a plurality of sources, wherein the input data comprises a source code from a plurality of source codes, a previous version of the source code, a static analysis results of the previous version of the source code and an automated false positives elimination (AFPE) results of the previous version of the source code;

generating, by one or more hardware processors, a set of alarms on the source code, based on analysis of the source code using at least one static analysis tool, via the one or more hardware processors;

constructing, by the one or more hardware processors, a code map using the source code and the previous version of the source code, based on a code mapping technique, via the one or more hardware processors;

constructing, by the one or more hardware processors, a set of delta alarms from amongst the set of alarms, using a delta alarms identification technique based on the code map and the static analysis results of the previous version of the source code, wherein the set of delta alarms comprises a plurality of newly generated alarms and a plurality of impacted alarms;

identifying, by the one or more hardware processors, a plurality of false positives from the set of delta alarms, wherein identifying the plurality of false positives comprises:
  generating an assertion for each the delta alarms from amongst the set of delta alarms;
  generating at least one annotated code based on an annotation technique, wherein each of the annotated code comprises at least one assertion;
  pre-processing each of the annotated code based on a set of pre-processing techniques to obtain at least one pre-processed annotated code, wherein the set of pre-processing techniques is selected based on a dynamic configuration input;
  identifying iteratively at least one verification call for the assertions in each of the pre-processed annotated code, wherein the verification call is based on a verification context provided as an input function from the pre-processed annotated code;
  computing a set of reusable verification calls and a set of non-reusable verification calls from the identified verification calls based on a reuse computation technique using the delta alarms associated to the assertions in the annotated code, the verification context, and the AFPE results from the previous version source code, wherein the reuse computation technique includes a conservative reuse technique or an aggressive reuse technique;
  making the verification calls to a verification tool for the set of non-reusable verification calls to obtain a set of verification results of non-reusable verification calls; and
  obtaining a set of verification results of reusable verification calls based on the AFPE results on the previous version of the source code; and
  identifying a plurality of false positives in the delta alarms corresponding to the assertions in the annotated code based on the set of verification results of the non-reusable verification calls and the set of verification results of the reusable verification calls; and eliminating, by one or more hardware processors, the false positives from the set of delta alarms to obtain a set of delta alarms remaining after the elimination and displaying the remaining delta alarms on a display screen.

* * * * *